United States Patent
Spirkovska

(10) Patent No.: US 7,129,857 B1
(45) Date of Patent: Oct. 31, 2006

(54) INTELLIGENT WEATHER AGENT

(75) Inventor: Liljana Spirkovska, Sunnyvale, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 145 days.

(21) Appl. No.: 10/789,049

(22) Filed: Feb. 26, 2004

(51) Int. Cl.
*G01C 23/00* (2006.01)

(52) U.S. Cl. .......................... 340/971; 340/973; 701/14

(58) Field of Classification Search ................. 340/971
See application file for complete search history.

(56) References Cited

U.S. PATENT DOCUMENTS

| | | | |
|---|---|---|---|
| 5,936,552 A * | 8/1999 | Wichgers et al. ............ 340/963 |
| 6,199,008 B1 * | 3/2001 | Aratow et al. .............. 701/120 |
| 6,650,972 B1 * | 11/2003 | Robinson et al. ............... 701/3 |
| 6,785,594 B1 * | 8/2004 | Bateman et al. ................ 701/9 |
| 6,917,860 B1 * | 7/2005 | Robinson et al. ............... 701/3 |
| 2001/0056316 A1 * | 12/2001 | Johnson et al. ............... 701/14 |

OTHER PUBLICATIONS

Liljana Spirkovska, Anticipatory, Multimodal Interfaces: General Aviation Weather Interface Agent, Dissertation, University of California Santa Cruz (Mar. 2003).
Lily Spirkovska, Suresh K. Lodha,"Context-Aware Intelligent Assistant Approach to Improving Pilot's Situational Awareness," NASA/TM-2004-212804 (Feb. 2004).

* cited by examiner

*Primary Examiner*—Daniel Wu
*Assistant Examiner*—George Bugg
(74) *Attorney, Agent, or Firm*—John F. Schipper; Robert M. Padilla

(57) ABSTRACT

Method and system for automatically displaying, visually and/or audibly and/or by an audible alarm signal, relevant weather data for an identified aircraft pilot, when each of a selected subset of measured or estimated aviation situation parameters, corresponding to a given aviation situation, has a value lying in a selected range. Each range for a particular pilot may be a default range, may be entered by the pilot and/or may be automatically determined from experience and may be subsequently edited by the pilot to change a range and to add or delete parameters describing a situation for which a display should be provided. The pilot can also verbally activate an audible display or visual display of selected information by verbal entry of a first command or a second command, respectively, that specifies the information required.

17 Claims, 11 Drawing Sheets

INTELLIGENT WEATHER AGENT

ORIGIN OF THE INVENTION

The invention described herein was made by employees of the United States Government and may be manufactured and used by or for the Government for governmental purposes without payment of any royalties thereon or therefor.

TECHNICAL FIELD

The present invention is a method for visual and aural presentation of weather data and related aviation data through anticipation of a pilot's present needs.

BACKGROUND OF THE INVENTION

Although general aviation (GA) flights account for about 60 percent of the total hours flown, GA flights account for about 92 percent of the aviation accidents. About 15 percent of the GA accidents are attributed to weather. Two factors that contribute to weather-related accidents are (1) the cognitive overload of interpreting the large amount of textual data, much of which may be irrelevant, and (2) the inadequacy of in-flight updates of data related to weather. Graphical displays of many aspects of weather are now available to supplement textual weather briefings. Data link technologies to provide weather data to GA pilots in flight are being developed.

Approximately 4 percent of non-military aircraft are classified as commercial air carriers; the remaining 96 percent are considered general aviation (GA) aircraft. Approximately 73 percent of the non-military aircraft are small aircraft, with 2 to 6 seats and 1 or 2 piston engines. Within this latter group, loss or lack of weather awareness has been responsible for most of the fatalities (an estimated 73 percent in 2001, for example) for at least two reasons: (1) delays in obtaining in-flight briefings, when these are requested; and (2) difficulty in interpreting in-flight weather briefings in the formats usually presented.

Where weather information is needed, the conventional method for in-flight briefings is for a pilot to request a verbal update of weather and wind conditions, using an aircraft radio, from a ground-based weather specialist. The time interval for interaction between pilot and weather specialist is very short and is limited to specific information explicitly requested by the pilot. The number of pilots seeking such information increases in a given region when the weather is worst and the pilots may need, but may be unable to request, additional information. This often produces long time delays in response by the weather specialist and may also produce artificially shortened interactions, as the specialist tries to respond to each pilot in a long queue. Faced with this situation, the specialist is unlikely to provide other useful information that can be acted upon by the pilot, or that may even reverse a decision to continue, alter or discontinue a flight by a given route.

What is needed is a system, specific to a particular pilot, that (1) senses and stores the types of weather information that is often requested by the pilot in one or more identifiable situations, (2) senses when an identifiable situation is present, (3) provides the weather information in one or more of several optional formats (e.g., alphanumeric text, graphical and audible) according to the pilot's preferences, and (4) allows automatic as well as manual change of the parameters that describe an identifiable situation.

SUMMARY OF THE INVENTION

These needs are met by the invention, which is a system and method that provides easy-to-interpret graphical presentations of weather elements (including wind data) that are becoming available as text through datalink. The system, sometimes referred to as the Aviation Weather Environment (AWE), also provides a novel interaction environment that greatly decreases a pilot's workload associated with developing, maintaining and interpreting an awareness of developing weather situations. The AWE system can anticipate the pilot's needs, monitor the data, analyze weather trends, and suggest alternative courses of action, without requiring pilot direct action but accommodating the pilot's preferences and habits. The AWE system also decreases the amount of head-down time required for the pilot to interpret the received weather data.

In one embodiment, the approach: (1) provides presently measured or estimated values for each of a selected subset of a set of situation parameters, where the situation parameter set includes distance of present location to a selected aircraft destination, predicted trip length, trip departure time, trip phase, visibility, cloud cover or ceiling, estimated longitudinal wind speed (at present location and/or at destination), estimated crosswind speed, estimated wind gust speed at destination, temperature, dew point and density altitude; (2) provides a database containing a collection of N reference aviation-situations, numbered $n=1 \ldots, N$ ($N \leq 2$), with each aviation-situation being characterized by an ordered set of value ranges of situation parameters drawn from the selected subset of parameters; and (3) when the measured or estimated value of each of the selected subset of parameters lies within the corresponding value range, the system displays a corresponding selected subset of weather data, in visually perceptible and/or audibly perceptible format and/or as an audible alarm signal. The corresponding subset of weather data is drawn from a set of weather data that includes one or more of estimated aircraft present altitude, estimated static air pressure at aircraft present altitude, estimated longitudinal wind speed (at present location and/or at destination), estimated cross wind speed, estimated wind gust speed, estimate of wind variability, estimated wind vector direction, temperature, dew point, temperature-dew point spread, density altitude, estimated sky condition for at least one altitude range, estimated ground visibility at aircraft present location, estimated ground visibility at aircraft destination, estimated precipitation, estimated visibility obscurations along aircraft flight route, estimated ceiling, estimated fuel required to reach destination, estimated distance from destination, recommended runway at destination, and time of most recent measurement upon which the subset of weather data is based.

The system automatically checks for availability of weather data updates and provides the original data and the updated data in one or more formats that include an alphanumeric display, a graphical display and an audibly perceptible read-out. The displays provide present conditions and predicted changes in these conditions over a time interval that corresponds to flight duration (from 30 min to several hours; depending upon the nature of the condition and the individual changes). This includes a verbal interaction interface that allows the pilot to call up particular information verbally and/or to obtain a verbal response. The system implements an intelligent agent that (1) senses the presence of any of a plurality of identifiable ("anticipated") situations in which the pilot often requests particular weather data, (2) automatically provides the specified weather data without prompting by the pilot, (3) automatically seeks and provides updates of the weather data, (4) advises the pilot of presence of any weather parameter values that fall outside a range optionally specified by the pilot as acceptable flight conditions, (5) provides predictions of changes in any of the anticipated weather data, and (6) allows the pilot to view and change the relevant values of any of the anticipated weather variables and/or of the flight route to be followed.

DESCRIPTION OF BEST MODES OF THE INVENTION

Figure 1:
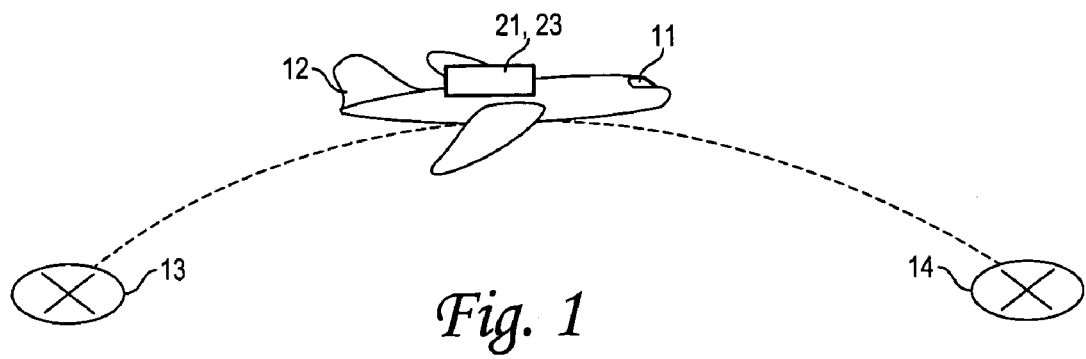
FIG. 1 illustrates use of a aircraft system according to the invention.

FIG. 1 illustrates use of an Aviation Weather Environment (AWE) system according to an embodiment of the invention. A pilot 11 in an aircraft 12 is enroute between a source (airport, etc.) 13 and an expected destination 14. Preferably, the pilot 11 has entered flight route parameters specifying part of, or all of, a flight route the pilot expects to follow on this flight, including an estimated time at which the pilot expects to depart from the source airport and predicted cruise air speed enroute.

Figure 2:
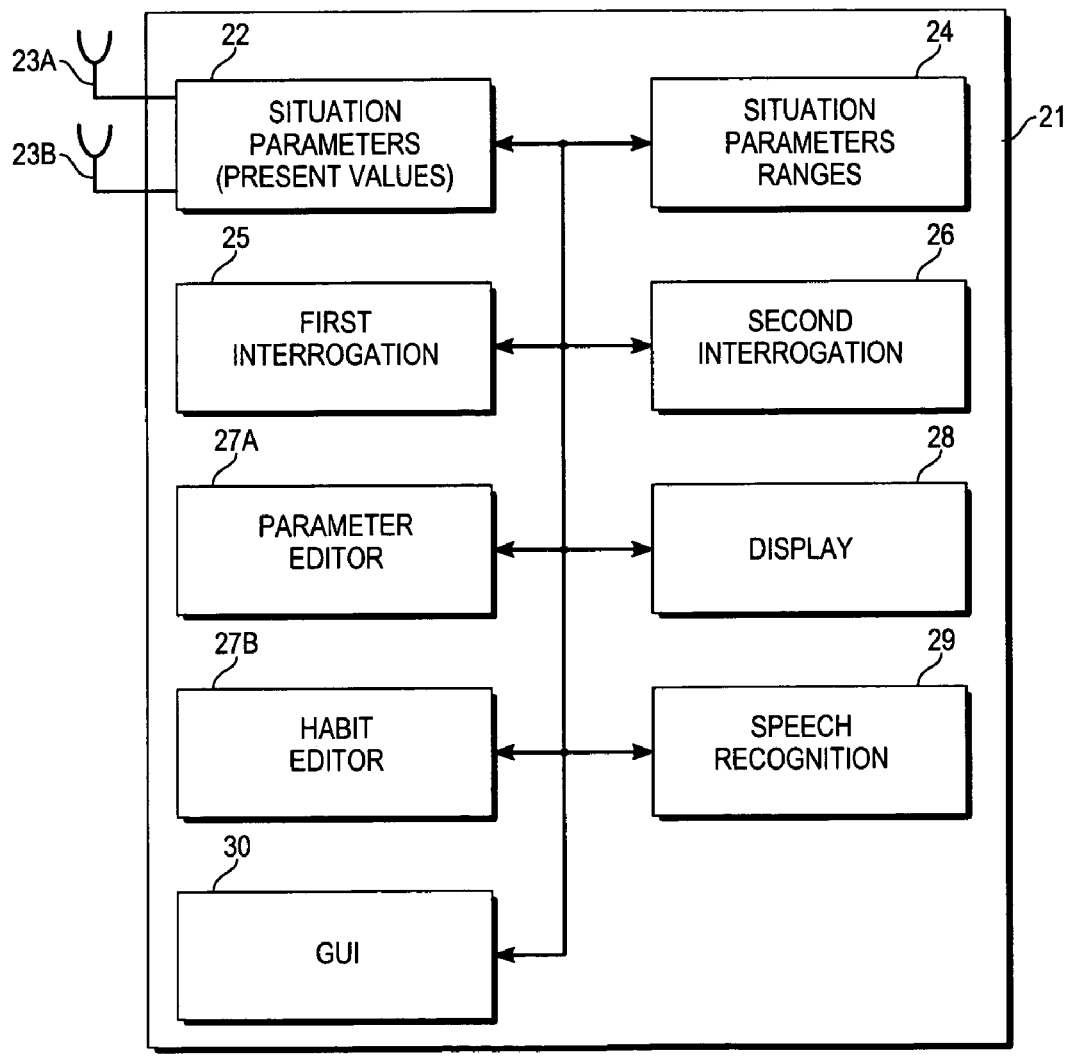
FIG. 2 illustrates a sensor array, database and interrogation modules used in the invention.

The aircraft 12 carries a system 21, illustrated in FIG. 2, that includes an array 22, having at least two antennas, 23A and 23B, that senses or otherwise provides the present value, including any available update value(s) and/or any predicted value(s), for one or more of the following situation parameters: trip length TL, present trip phase TP, trip departure time, distance $\Delta s(dest)$ of present location to a selected aircraft destination, visibility VIS, cloud cover and ceiling Ce, estimated longitudinal wind speed enroute and/or at destination $v_w(long)$, estimated cross wind speed enroute and/or at destination $v_w(cr)$, estimated wind gust speed at destination $v_w(gust)$, temperature T, dew point T(dew), dew point spread $\Delta T(dew)=T-T(dew)$, density altitude h(dens); and time of most recent measurement upon which the subset of weather data is based. The antenna 23A receives Global Positioning System (GPS) signals or other location determination signals and the antenna 23B receives weather link signals, such as METAR, TAF and/or Winds Aloft.

The system 21 also includes a situation database 24 that contains a range (default, pilot-provided or determined by the system, referred to collectively as "system's preference") for each of one or more situation parameters, drawn from the set provided by the array 22, where each set of situation parameter ranges defines a "flight situation" in which the pilot should be provided with a visually perceptible and/or audibly perceptible display of relevant weather data and/or audible alarm signal corresponding to that flight situation.

Figure 3:
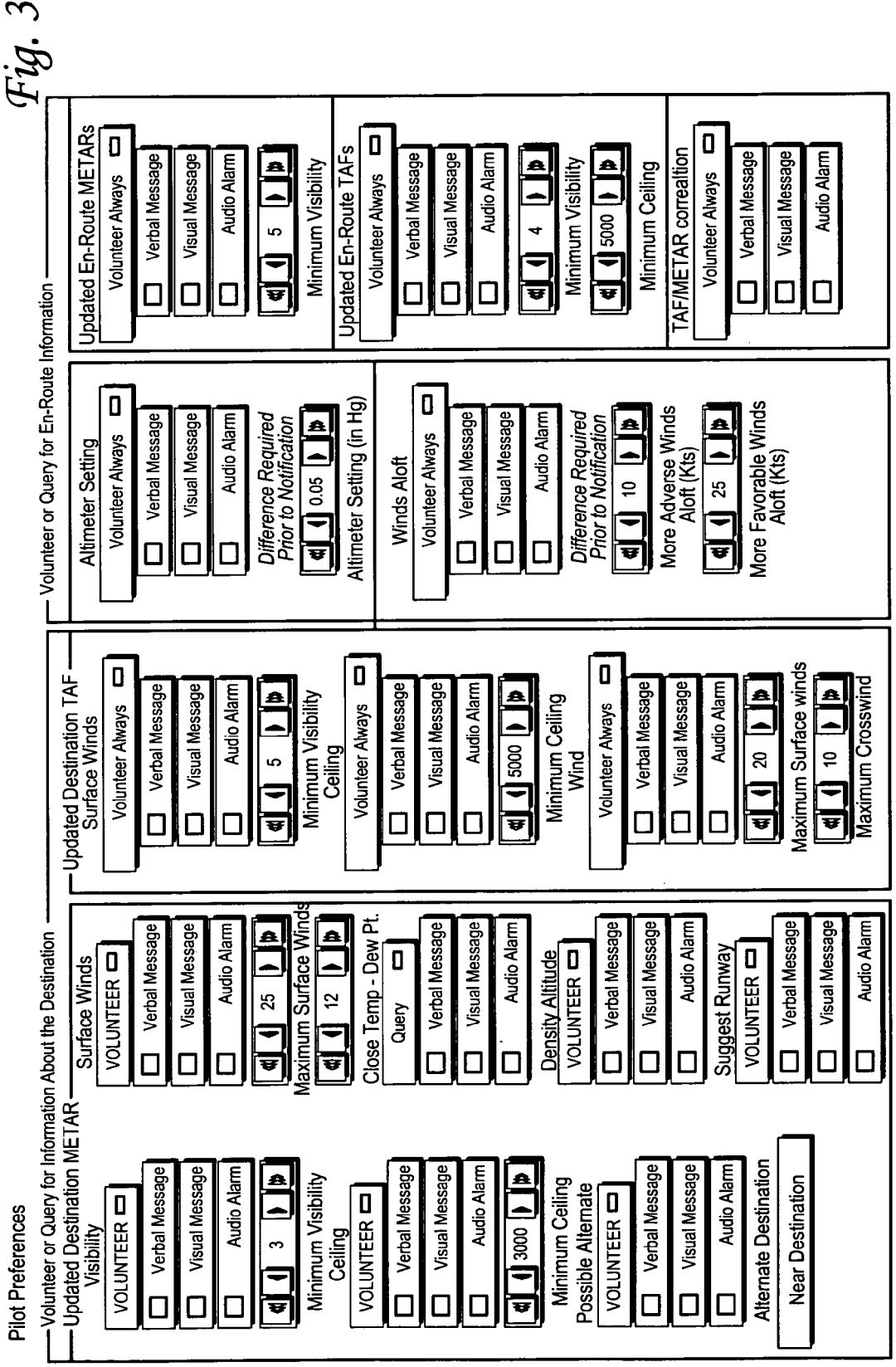
FIG. 3 illustrates an edit module used in the invention.

FIG. 3 is a schematic view of a panel of a parameter edit module 26 that may be used by the pilot to indicate preferences for the situation parameters associated with a given "situation," for which a display is provided. As part of a pilot preference list, the pilot can choose a visual display, an audible display, an audio alarm or some combination, for a display associated with a given situation.

The situation database 24 communicates with a parameter editor 27A and a habit editor 27B (FIG. 2) that allow the pilot to (1) specify a desired range for one or more situation parameters in a selected subset and (2) add or delete a situation parameter in a selected subset of such parameters that define a "situation" in which a display would normally be provided and (3) specify one or more display modes (visual, audible, alarm signal) in which a specified subset of one or more weather parameter values is to be presented, as illustrated in FIG. 3. The METAR weather parameter values VIS(dest), Ce(dest), $v_w(dest)$, $\Delta T(dew)$, h(dens;dest), and one or more pilot-specified alternate weather parameters for a destination airport can be addressed with respect to choices for (i) volunteer (or don't volunteer) a parameter value as part of a specified weather parameter subset and (ii) display mode(s) to be used, and may recommend use of a specific runway at the destination (e.g., to minimize $v_w(cr;dest)$). The TAF weather parameter values VIS(dest), Ce(dest), $v_w(dest)$ and $v_w(cr;dest)$ for a destination airport can also be addressed with respect to the choices (i) and (ii). Enroute weather parameter values for altimeter settings, winds aloft, METAR thresholds VIS(thr) and Ce(thr), TAF thresholds VIS(thr) and Ce(thr), and METAR versus TAF parameter correlation can also be addressed with respect to the choices (i) and (ii).

The system 21 in FIG. 2 also includes a first interrogation module 25 that interrogates one or more other sources of relevant flight information, obtains and downloads updated values of relevant flight parameters, and replaces an extant situation parameter value in the array 22 by an updated value (including the effect of more recent measurements) for that situation parameter. When appropriate, the first interrogation module 25 also advises the pilot of any substantial change in the (updated) value of a situation parameter, where this parameter helps define one or more of the situations in the parameter range database 24.

The system also includes a second interrogation module 26, which is optionally part of the first interrogation module 25, that interrogates one or more sources of relevant predicted flight information, obtains and downloads present and/or predicted values of relevant flight parameters, and provides the present and/or predicted parameter values, together with a time interval for predicted value applicability, for the array 22. Where the one or both of the interrogation modules, 25 and 26, determines that one or more weather parameters should be displayed, a display module 28 provides the appropriate information for the pilot in at least one of a visually perceptible format, an audibly perceptible format and an aubile alarm signal. The system 21 optionally includes a speech recognition module 29 that receives and recognizes voice commands from the pilot and a graphical user interface (GUI) module 30 that receives visual commands from, and displays visually perceptible information for, the pilot.

A first example of a situation that might be included in and defined by the parameter range database 24 is the following. When trip length=system's preference (short, medium or long) AND trip phase={pre-departure, takeoff, ascent or cruise} AND
$\{v_w(present;dest)-v_w(forecast;dest) \geq \Delta v_w(thr) \quad (>0)\}$,
THEN display EFR(dest)=fuel(est;dest)

A second example of a situation that might be included in and defined by the parameter range database 24, using an METAR report, is the following. When trip length=system's preference (short, medium or long) AND trip phase={pre-departure, takeoff, ascent or cruise} AND {{$\Delta T(dew;dest) \leq \Delta T(dew;thr)$} OR {$VIS(dest) \leq VIS(dest;thr)$} OR {$Ce(dest) \leq Ce(dest;thr)$} OR {$v_w(long;dest) \geq v_w(long;thr)$} OR {$v_w(cr;dest) \geq v_w(cr;thr)$}}, THEN display at least one of {$\Delta T(dew;dest)$ and $VIS(dest)$ and $Ce(dest)$ and $v_w(long;dest)$ and $v_w(cr;dest)$}

Where a TAF report, rather than an METAR report, is used, the inquiry {$\Delta T(dew;dest) \leq \Delta T(dew;thr)$} and display of are deleted; and one or more of the threshold values, $VIS(dest;thr)$, $Ce(dest;thr)$, $v_w(long;thr)$ and $v_w(cr;thr)$, may be different for an METAR report and for a TAF report.

A third example of a situation that might be included in and defined by the parameter range database 24, using an METAR report, is the following. When trip length=system's preference (short, medium or long) AND trip phase={approach} AND {{$VIS(dest) \leq VIS(dest;thr)$} OR {$Ce(dest) \leq Ce(dest;thr)$} OR {$v_w(long;dest) \geq v_w(long;thr)$} OR {$v_w(cr;dest) \geq v_w(cr;thr)$} OR {$h(dens;dest) \geq h(dens(dest;thr)$}}, THEN display at least one of {$VIS(dest)$ and $Ce(dest)$ and $v_w(long;dest)$ and $v_w(cr;dest)$ and $h(dens(dest)$ and recommended destination runway}.

Where a TAF report, rather than an METAR report, is used, the inquiry {$h(dens(dest) \leq h(dens;thr)$} and display of $h(dens;dest)$ are deleted; and one or more of the threshold values, $VIS(dest;thr)$, $Ce(dest;thr)$, $v_w(long;thr)$} and $v_w(cr;thr)$, may be different for an METAR report and for a TAF report.

A fourth example of a situation that might be included in and defined by the parameter range database 24, using an METAR report, is the following. When trip length=system's preference (short, medium or long) AND trip phase={cruise} AND {{$VIS(NANYFB) \leq VIS(NANYFB;thr)$} OR {$Ce(NANYFB) \leq Ce(NANYFB;thr)$} OR {$h(dens;NANYFB) \geq h(dens;NANYFB;thr)$}}, THEN display at least one of {location of NANYFB and $VIS(NANYFB)$ and $Ce(NANYFB)$ and $h(dens;NANYFB)$ and recommended destination runway}.

As used herein, "NANYFB" refers to a nearest airport, within a selected transverse distance (such as 20–50 miles) from the specified flight route, and not yet flown by on the flight route. Where a TAF report, rather than an METAR report, is used, the inquiry {$h(dens) \leq h(dens;thr)$} and display of $h(dens;dest)$ are deleted and one or more of the threshold values, $VIS(dest;thr)$ and $Ce(dest;thr)$, may be different for an METAR report and for a TAF report.

A fifth example of a situation that might be included in and defined by the parameter range database 24, using an METAR report, is the following. When trip length=system's preference (short, medium or long) AND {{$VIS(forecast;dest) - VIS(present;dest) \geq \Delta VIS(thr)$ ($\geq 0$)} OR {$Ce(forecast;dest) - Ce(present;dest) \geq \Delta Ce(thr)$ ($\geq 0$)} OR {$\Delta T(dew;dest) \leq \Delta T(dew;thr)$} OR {$v_w(long;dest) \geq v_w(long;thr)$} OR {$v_w(cr;dest) \geq v_w(cr;thr)$}}, THEN display at least one of {$VIS(present;dest)$ and $Ce(present;dest)$ and $\Delta T(dew;dest)$ and $v_w(long;dest)$ and $v_w(cr;dest)$}.

Where a TAF report, rather than an METAR report, is used, the inquiry {$\Delta T(dew;dest) \leq \Delta T(dew;thr)$} and display of $\Delta T(dew;dest)$ are deleted; and one or more of the threshold values, $VIS(dest;thr)$, $Ce(dest;thr)$, $v_w(long;thr)$} and $v_w(cr;thr)$, may be different for an METAR report and for a TAF report.

A sixth example of a situation that might be included in and defined by the parameter range database 24 is the following. When trip length=system's preference (short, medium or long) AND trip phase={cruise, descent or approach}

$\Delta s(dest) \leq \Delta s(thr)$ AND

{{$v_w(cr;dest) \geq v_w(cr;thr)$} OR {$v_w(gust;dest) \geq v_w(gust;thr)$}}, THEN display at least one of {$v_w(cr;dest)$ and $v_w(gust;dest)$ and recommended destination runway}.

A seventh example of a situation that might be included in and defined by the parameter range database 24 is the following. When trip length=system's preference (short, medium or long) AND weather parameter difference $|WP(METAR;m) - WP(TAF;m)|$ is at least equal to $\Delta WP(thr;m)$, for at least one number, $m=m'$, ($m=1, \ldots, M$; $M \geq 1$), THEN display at least one of $WP(METAR;m')$ and $WP(TAF;m')$.

Here, the quantities such as $\Delta VIS(thr)$, $\Delta Ce(thr)$, $\Delta T(dew;thr)$, $h(dens;thr)$, $v_w(long;thr)$, $v_w(cr;thr)$, $v_w(gust;thr)$, $\Delta s(thr)$ are appropriate numerical values that help define a range for the corresponding parameter. The system's preference for trip length TL may be a default value, pilot-provided or determined by the system.

The system enables the pilot to customize what information is displayed, the situations in which particular information is displayed and the mode(s) of display (visual, audible and/or alarm). The AWE system also utilizes a machine learning approach to automatically identify situations in which the pilot often requests display of a particular subset of information (weather parameters).

FIGS. 4–10 are flow charts of procedures for determining if a particular subset of flight information should be displayed, based only on the parameter ranges for the situations set forth in the preceding first, second, third and fourth examples set forth in the preceding. A flow chart for a complete set of situations for a given pilot may cover more procedures.

Figure 4:
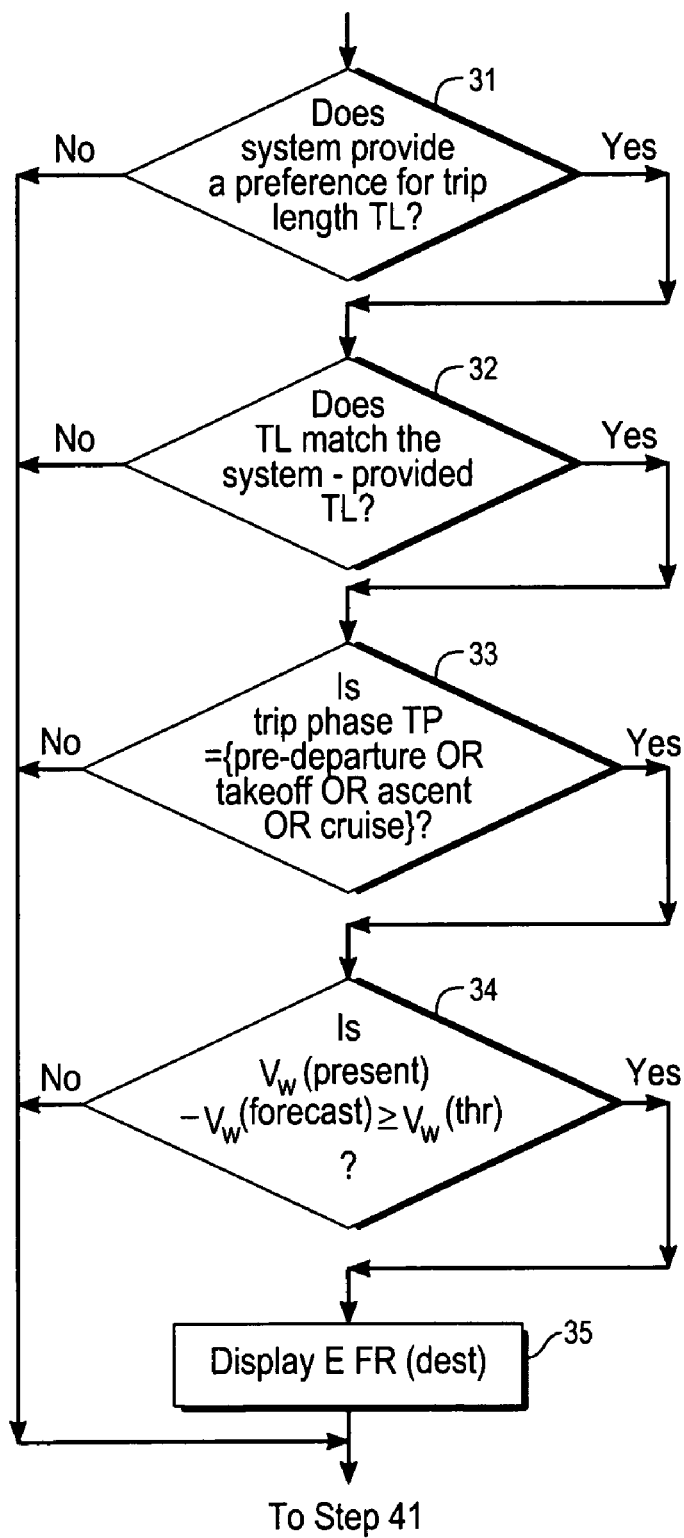
FIGS. 4–11 are flow charts of procedures for practicing the invention.

In step 31 (optional) in FIG. 4, the system determines if the system has provided a preference for trip length TL for this situation. The system may provide a TL preference for one situation and decline to provide a TL preference for another situation so that this query is answered independently in each situation. If the answer to the query in step 31 is "no," the system optionally moves to step 41 in FIG. 5. If the answer to the query in step 31 is "yes," the system moves to step 32 and inquires if the TL for the present trip is covered by a system TL preference. If the answer to the query in step 32 is "yes," the system moves to step 33 and determines if the trip phase TP={pre-departure OR takeoff OR ascent OR cruise}. If the answer to the query in step 33 is "yes," the system moves to step 34 and determines if a velocity difference $v_w(present;dest) - v_w(forecast;dest) \geq \Delta v_w(thr)$, where $\Delta v_w(thr)$ is a selected positive threshold value.

If the answer to the query in step 34 is "yes," the system moves to step 35 and displays (visually and/or audibly) an estimate EFR(dest) of the amount of fuel required to reach the destination from the present location, and optionally moves to step 41. If the answer to the query in step 32, or the answer to the query in step 33, or the answer to the query in step 34 is "no," the system optionally moves to step 41.

Figure 5:
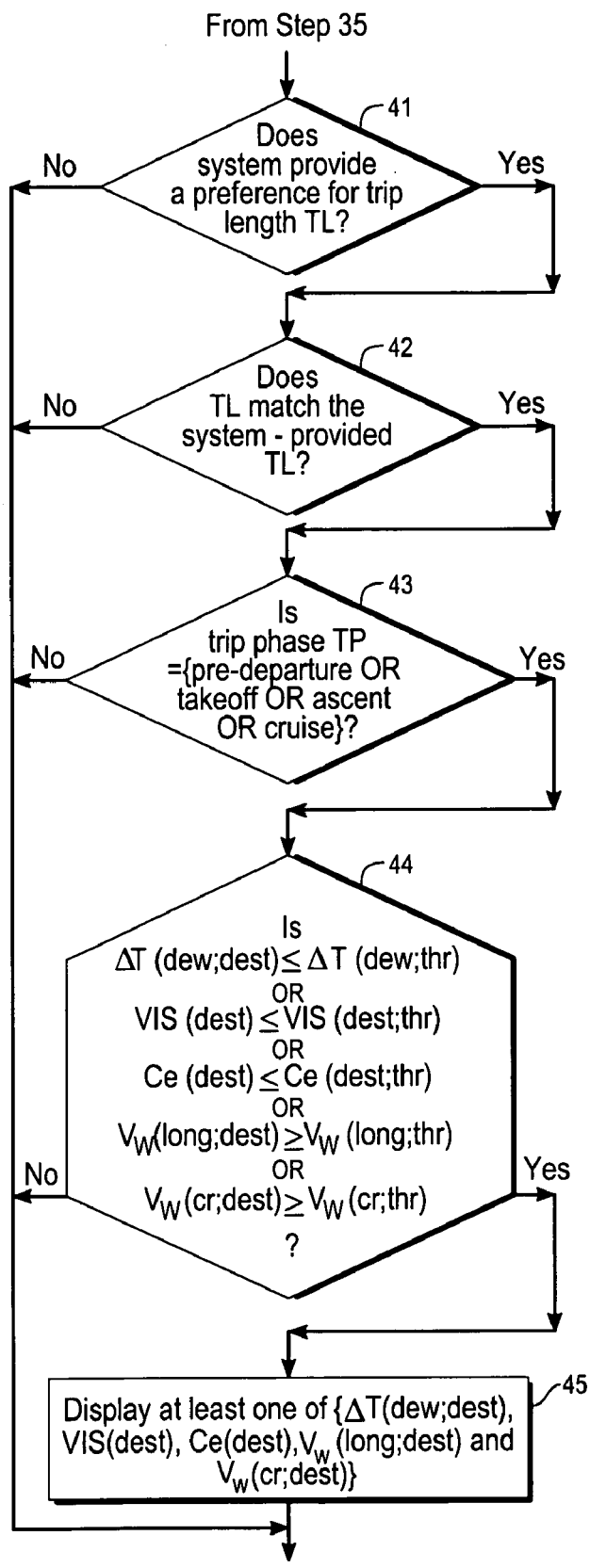

In step 41 (optional) in FIG. 5, the system determines if the system has provided a preference for trip length TL for this situation, which is assumed to rely upon a METAR report. If the answer to the query in step 41 is "no," the system moves to step 51 in FIG. 6. If the answer to the query in step 41 is "yes," the system moves to step 42 and inquires if the TL for the present trip is covered by a system TL preference. If the answer to the query in step 42 is "yes," the system moves to step 43 and determines if the trip phase TP={pre-departure OR takeoff OR ascent OR cruise}. If the answer to the query in step 43 is "yes," the system moves to setp 44 and determines if at least one of the following inequalities is true: $\{\Delta T(dew;dest) \leq \Delta T(dew;thr)\}$ OR $\{VIS(dest) \leq VIS(dest;thr)\}$ OR $\{Ce(dest) \leq Ce(dest;thr)\}$ OR $\{v_w(long;dest) \geq v_w(long;thr)\}$ OR $\{v_w(cr;dest) \geq v_w(cr;thr)\}$. If the answer to the query in step 44 is "yes," the system, in step 45, displays at least one of $\{\Delta T(dew;dest)$ and $VIS(dest)$ and $Ce(dest)$ and $v_w(long;dest)$ and $v_w(cr;dest)\}$, and optionally moves to step 51 in FIG. 6. If the answer to the query in step 42, or in step 43, or in step 44 is "no," the system optionally moves to step 51. If the situation relies on a TAF report rather than on a METAR report, the inequality $\{\Delta T(dew;dest) \leq \Delta T(dew;thr)\}$ is deleted in step 44, and display of $\Delta T(dew;dest)$ is deleted in step 45.

Figure 6:
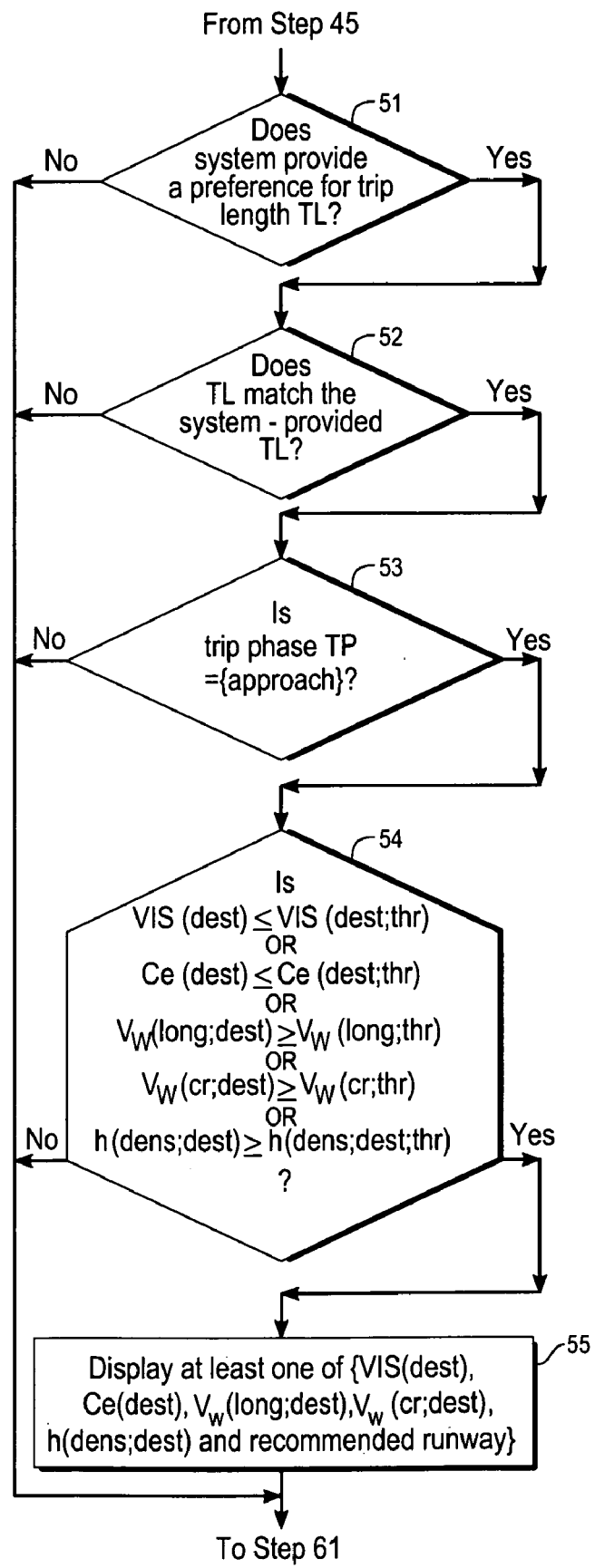

In step 51 (optional) in FIG. 6, the system determines if the system has provided a preference for trip length TL for this situation, which is assumed to rely upon a METAR report. If the answer to the query in step 51 is "no," the system moves to step 61 in FIG. 7. If the answer to the query in step 51 is "yes," the system moves to step 52 and inquires if the TL for the present trip is covered by a system TL preference. If the answer to the query in step 52 is "yes," the system moves to step 53 and determines if the trip phase TP={approach}. If the answer to the query in step 53 is "yes," the system determines, in step 54, if at least one of the following inequalities is true: $\{\{VIS(dest) \leq VIS(dest;thr)\}$ OR $\{Ce(dest) \leq Ce(dest;thr)\}$ OR $\{v_w(long;dest) \geq v_w(long;thr)\}$ OR $\{v_w(cr;dest) \geq v_w(cr;thr)\}$ OR $\{h(dens;dest) \geq h(dens;dest;thr)\}$. If the answer to the query in step 54 is "yes," the system, in step 55, displays at least one of $\{VIS(dest)$ and $Ce(dest)$ and $v_w(long;dest)$ and $v_w(cr;dest)$ and $h(dens;dest)$ and recommended runway$\}$ and optionally moves to step 61. If the answer to the query in step 52, or in step 53, or in step 54 is "no," the system optionally moves to step 61. If the situation relies on a TAF report rather than on a METAR report, the inequality $\{h(dens;dest) \geq h(dens;thr)\}$ is deleted in step 54, and display of $h(dens;dest)$ is deleted in step 55.

Figure 7:
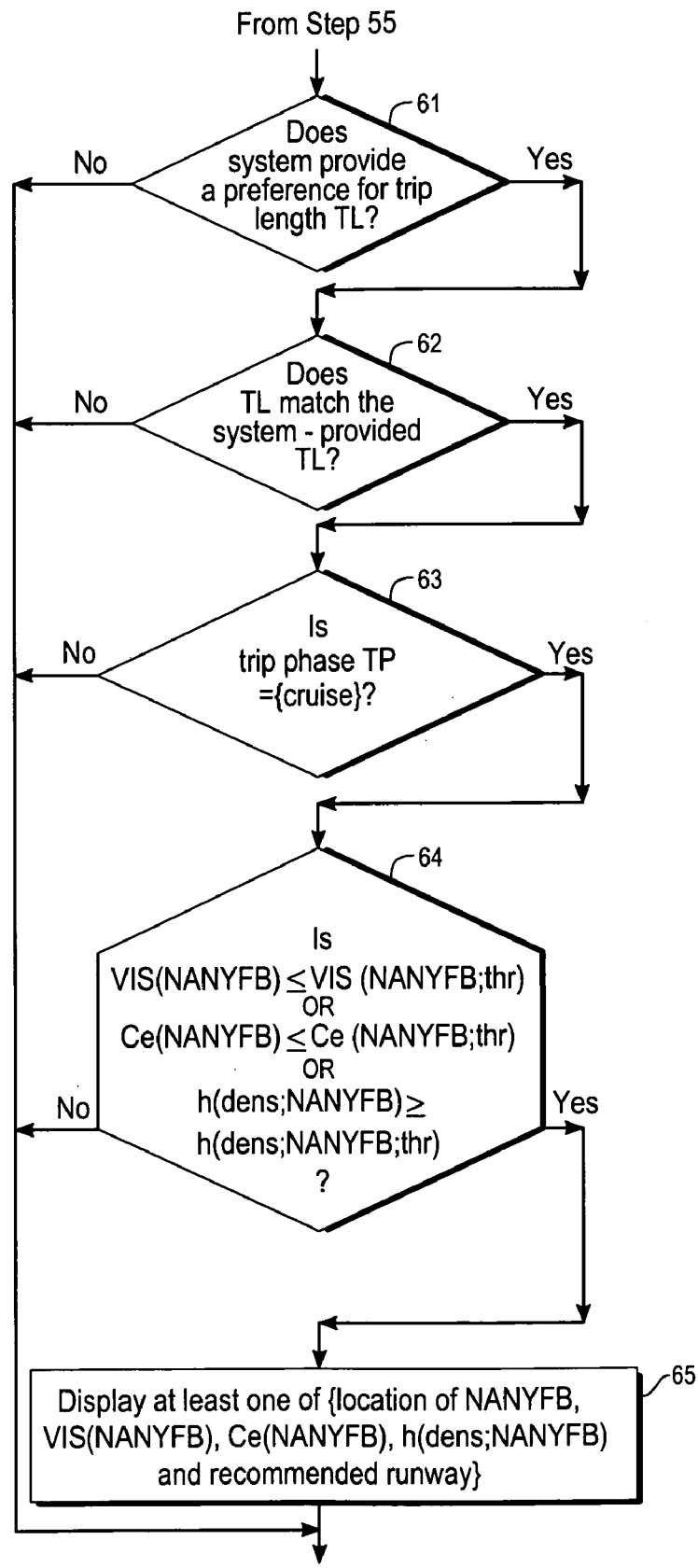

In step 61 (optional) in FIG. 7, the system determines if the system has provided a preference for trip length TL for this situation, which is assumed to rely on a METAR report. If the answer to the query in step 61 is "no," the system moves to step 71 in FIG. 8. If the answer to the query in step 61 is "yes," the system moves to step 62 and inquires if the TL for the present trip is covered by a system TL preference. If the answer to the query in step 62 is "yes," the system moves to step 63 and determines if the trip phase TP={cruise}. If the answer to the query in step 63 is "yes," the system determines, in step 64, if at least one of the following inequalities is true: $\{VIS(NANYFB) \leq VIS(NANYFB;thr)\}$ OR $\{Ce(NANYFB) \leq Ce(NANYFB;thr)\}$ OR $\{h(dens;NANYFB) \geq h(dens;NANYFB;thr)\}$. If the answer to the query in step 64 is "yes," the system moves to step 65 and displays at least one of {location of NANYFB and VIS(NANYFB) and Ce(NANYFB) and h(dens;NANYFB) and recommended runway} and optionally moves to step 71. If the answer to the query in step 62, or in step 63, or in step 64 is "no," the system optionally moves to step 71. If the situation relies on a TAF report rather than a METAR report, the inequality $\{h(dens;NANYFB) \geq h(dens;NANYFB;thr)\}$ is deleted in step 64, and display of h(dens;NANYFB) is deleted in step 65.

Figure 8:
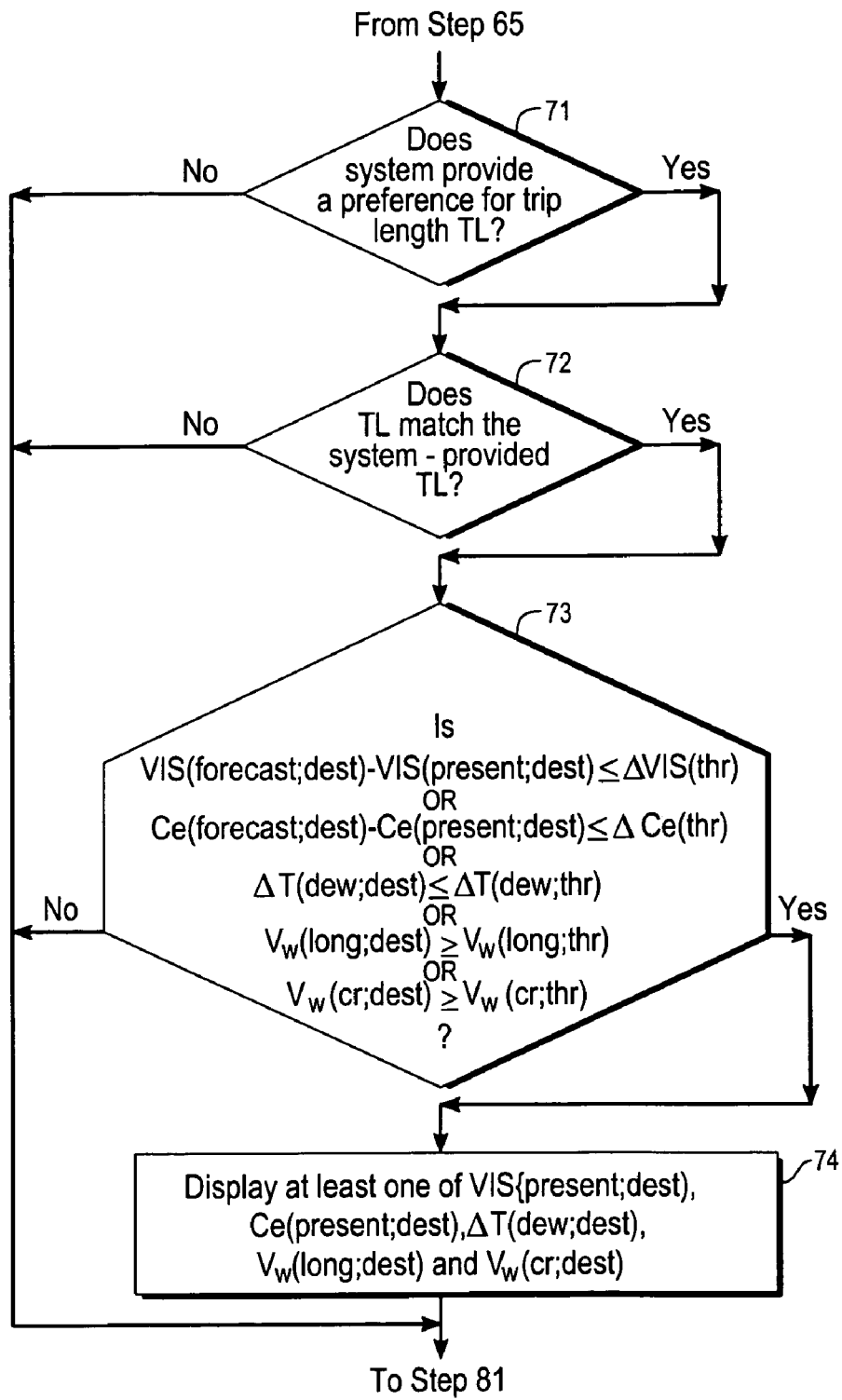

In step 71 (optional) in FIG. 8, the system determines if the system has provided a preference for trip length TL for this situation. If the answer to the query in step 71 is "no," the system moves to step 81 in FIG. 9. If the answer to the query in step 71 is "yes," the system moves to step 72 and inquires if the TL for the present trip is covered by a system TL preference. If the answer to the query in step 72 is "yes," the system moves to step 73 and determines if at least one of the following inequalities is satisfied: $\{VIS(forecast;dest)-VIS(present;dest) \geq \Delta VIS(thr) \ (\geq 0)\}$ OR $\{Ce(forecast;dest)-Ce(present;dest) \geq \Delta Ce(thr) \ (\geq 0)\}$ OR $\{\Delta T(dew;dest) \leq \Delta T(dew;thr)\}$ OR $\{\{v_w(long;dest) \geq v_w(long;thr)\}$ OR $\{\{v_w(cr;dest) \geq v_w(cr;thr)\}\}$. If the answer to the query in step 73 is "yes," the system moves to step 74 and displays at least one of $\{VIS(present;dest)$ and $Ce(present;dest)$ and $\Delta T(dew;dest)\}$ and $v_w(long;dest)$ and $v_w(cr;dest)\}$ and optionally continues to step 81. If the answer to the query in step 72 is no, or in step 73, or in step 74 is "no," the system optionally moves to step 81. If the situation relies on a TAF report rather than a METAR report, the inequality $\{\Delta T(dew;dest) \leq \Delta T(dew;thr)\}$ is deleted in step 73, and display of $\Delta T(dew;dest)$ is deleted in step 74.

Figure 9:
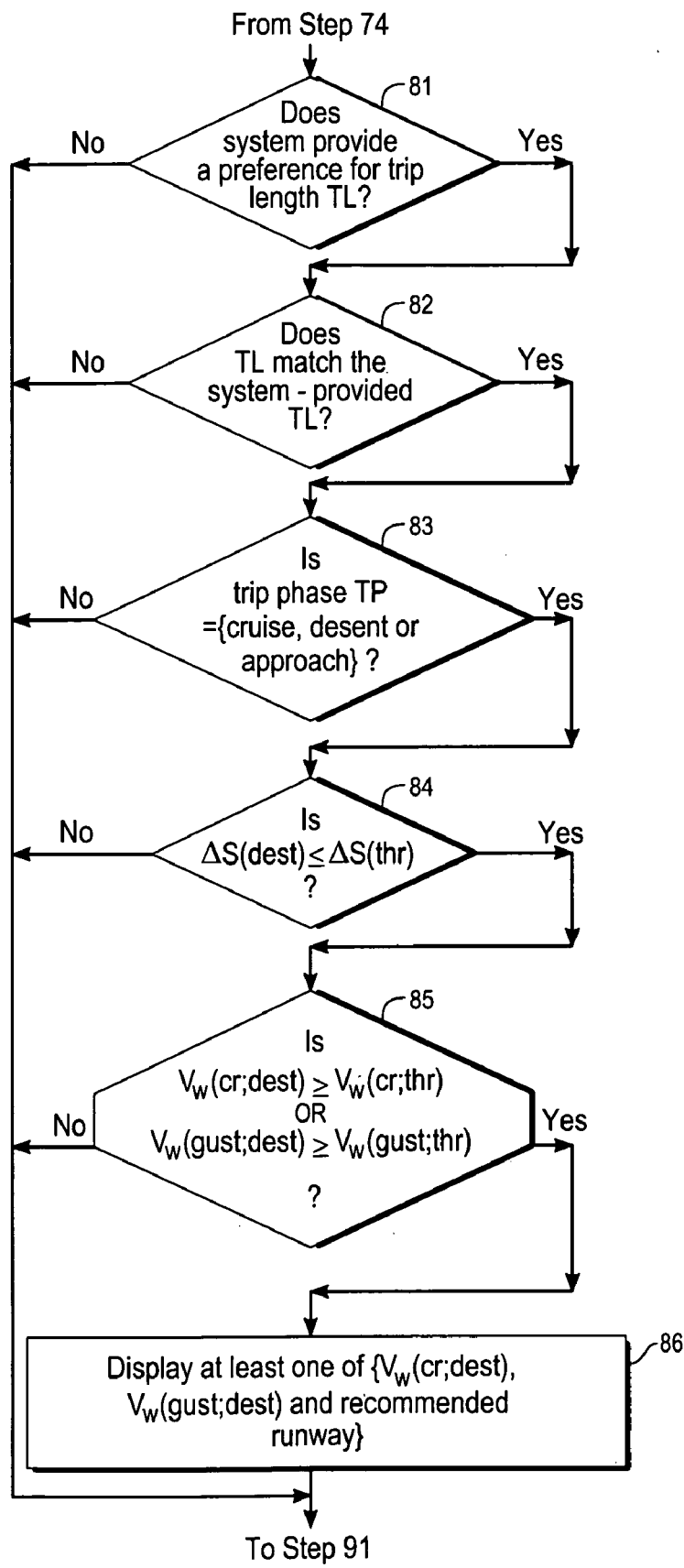

In step 81 (optional) in FIG. 9, the system determines if the system has provided a preference for trip length TL for a display. If the answer to the query in step 81 is "no," the system moves to step 91 in FIG. 10. If the answer to the query in step 81 is "yes," the system moves to step 82 and inquires if the TL for the present trip is covered by a system TL preference. If the answer to the query in step 82 is "yes," the system moves to step 83 and determines if the trip phase TP={cruise, descent or approach}. If the answer to the query in step 83 is "yes," the system moves to step 84 and determines if the remaining distance to the destination satisfies $\Delta s(dest) \leq \Delta s(thr)$. If the answer to the query in step 84 is "yes," the system moves to step 85 and determines if at least one of the following inequalities is satisfied: $\{v_w(cr;dest) \geq v_w(cr;thr)$ OR $\{v_w(gust;dest) \geq v_w(gust;thr)\}$. If the answer to the query in step 85 is "yes," the system, in step 86, displays at least one of $\{v_w(cr;dest)$ and $v_w(gust;dest)$ and recommended runway$\}$ and optionally moves to step 91 in FIG. 10. If the answer to the query in step 82, or in step 83, or in step 84, or in step 85 is "no," the system optionally moves to step 91.

Figure 10:
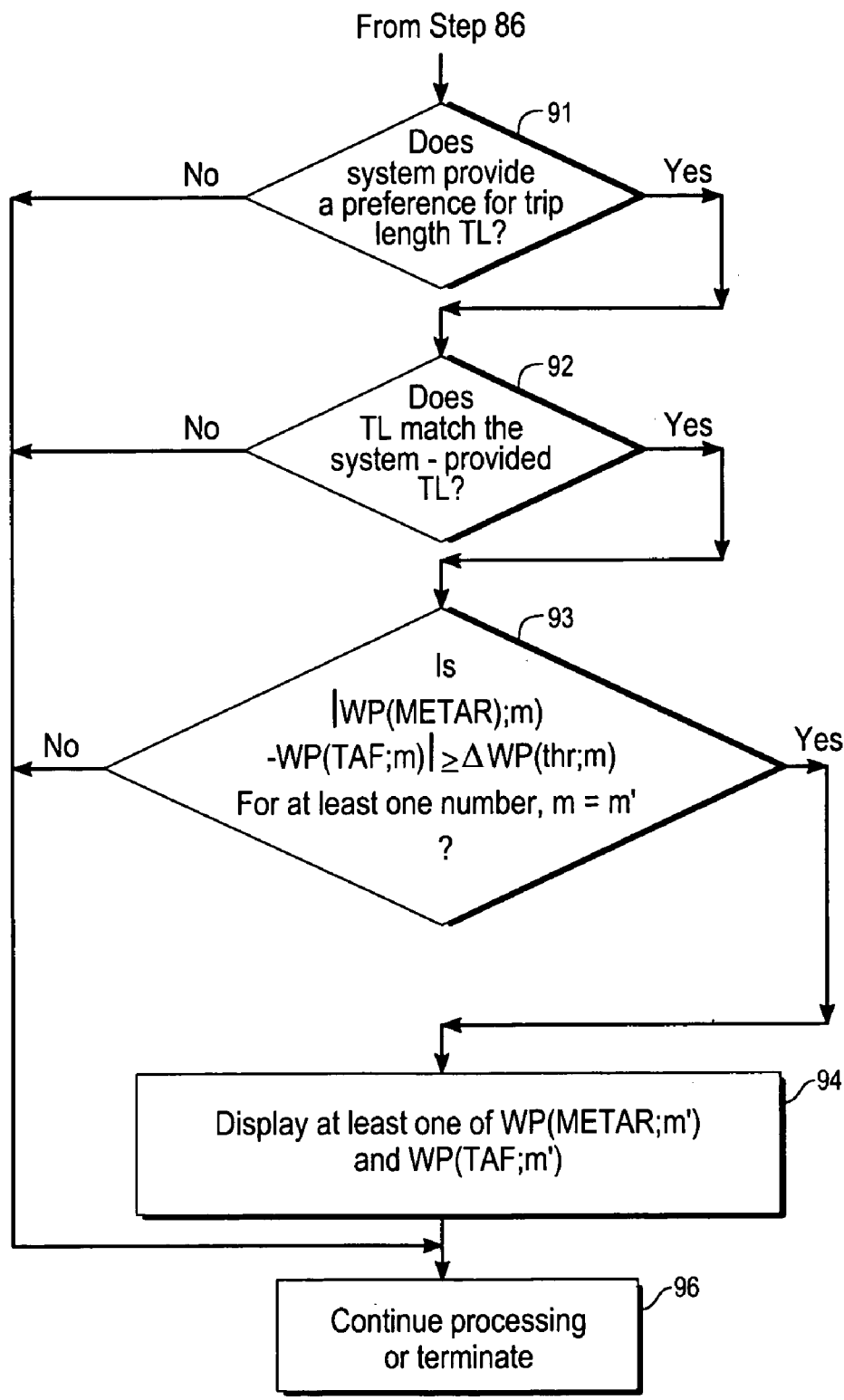

In step 91 (optional) in FIG. 10, the system determines if the system has provided a preference for trip length TL for a display. If the answer to the query in step 91 is "no," the system moves to step 96. If the answer to the query in step 91 is "yes," the system moves to step 92 and inquires if the TL for the present trip is covered by a system TL preference. If the answer to the query in step 92 is "yes," the system moves to step 93 and determines if a magnitude of a difference between a METAR weather parameter and a corresponding TAF weather parameter, $|WP(METAR;m)-WP(TAF;m)|$, is at least equal to a selected threshold amount, $\Delta WP(thr;m)$, for at least one number, m=m'

(m=1, ..., M; M≧1). If the answer to the query in step 93 is "yes" for parameter number m=m', the system, in step 94, displays at least one of {WP(METAR;m') and WP(TAF;m')} and moves to step 96. In step 96, the system optionally continues with other processing or terminates.

Whenever an updated weather report (METAR, TAF, Winds Aloft) is received, the system determines whether the updated parameters fall witiin a range corresponding to a situation. If the parameters do not fall within a range corresponding to a situation but the information is relevent, given the present location of the aircraft, the system displays the corresponding information.

For example, if visibility decreases below the pilot's minimum acceptable value at an airport the aircraft has already flown past, information relating to that airport would be irrelevant and would not be displayed. However, if visibility decreases at the aircraft's destination airport, the pilot would be notified of this development, especially if the original forecast did not predict this condition.

In addition to automatically checking updated reports for relevant anomalous situations, the system incorporates a machine learning algorithm, EARL, to learn the pilot's habits in requesting particular weather information during the approach phase of a flight, and optionally during other phases of the flight. Using this functionality, the system can anticipate a pilot's habitual request for certain weather information and can provide this information without requiring pilot action. A parameter range for each parameter involved in a situation may be a default value, may be chosen by the pilot and/or may be identified by EARL.

EARL relies, in part, upon noting and memorizing the values of the identified situation parameters that are present each time the pilot verbally and/or electronically requests flight information in visually perceptible and/or audibly perceptible form. EARL notes correspondences between ranges of values of different situation parameters when a flight information request is made by the pilot. One method of accomplishing this is to fuse the values for each relevant situation parameter, using a union, maximum, minimum or statistical averaging operation, depending upon the parameter.

For example, distance from destination, $\Delta s$, is fused by computing average values of $\Delta s$ when a request is made. Visibility, temperature and dew point spread are fused by computing a maximum value for each parameter, each time a request is made; and longitudinal wind speed, cross wind speed, gust wind speed, temperature and density altitude are fused by computing the minimum values of each when a request is made. EARL may learn to provide a particular type of information when VIS≦20 nautical miles, $v_w(cr)$ ≧15 knots and/or T≧80° F. Optionally, EARL also accepts a specification of a situation parameter subset and (optional) relevant range of the situation parameter in that subset.

Certain subsets of coordinated parameters are naturally grouped together, excluding other parameters. For example, when a request for density altitude information is made, only the values of present altitude h, temperature T and density altitude h(dens) are relevant; and a request for information on presence of fog or other obscurations at the destination will rely primarily upon temperature-dew point spread $\Delta T(dew)$ and visibility VIS. Specification of these coordinated parameters subsets initially will prevent the system from learning from irrelevant combinations of (non-related) parameter values. Identification of what are believed to be coordinated parameters, based on a small set of examples, can lead to the undesired extraction of unforeseen habits that are preferably ignored. As noted in the preceding, the system 21 provides a graphic-based habit editing module 26B, that allow the pilot to view, modify, edit and delete rules that have been identified by EARL.

Operation of the invention is best understood by first examining procedures followed by a pilot in the pre-flight, ascent, cruise and descent stages of a flight. In the pre-flight phase, the pilot specifies a proposed flight route to a DUAT source, as a sequence of airport or waypoint identifiers. The DUAT source returns relevant METAR, TAF and Winds Aloft reports for all airports within a pilot-specified transverse distance d(trans) (typically 50–200 nm) from the flight route.

A Direct User Access Terminal (DUAT) report, is a collection of relevant weather information offered by one or more private companies under a contract with the F.A.A. and is available to all pilots and student pilots. A DUAT report presents data obtained from the National Weather Service (NWS) through the F.A.A. A DUAT briefing provides present weather information and forecasts on the position of fronts and pressure systems, present wind conditions and forecasts at airports at altitudes up to 39,000 feet, cloud layer coverages and altitudes, weather variables, visibility conditions, widespread low visibility, freezing levels, icing levels, warnings about meteorological conditions (thunderstorms, etc.), turbulence, mountain obscuration, unlighted obstructions, out-of-service equipment, and reports from other pilots (PIREPs, etc.) concerning actual conditions encountered. This information may be part or all of reports from METAR, TAF, Winds Aloft, PIREPs and NOTAMs, and other sources. Some, but not all, of a DUAT report may be presented visually, including weather charts, surface analysis, surface forecast charts, high/low pressure systems, warm/cold fronts and precipitation areas. The charts provide a nationwide overview of relevant weather conditions but do not focus on specific flight routes or flight time intervals. A DUAT report does not provide visually perceptible charts on present values for meteorological conditions (METARs) or for terminal area forecasts (TAFs).

The pilot analyzes the DUAT source reports and determines (1) whether the aircraft capabilities are within the requirements imposed by the weather conditions and (2) how many landings at intermediate airports may be required, given the distance to the destination and the predicted Winds Aloft reports. If the proposed flight route is over mountainous terrain, the pilot either (i) verifies that the aircraft has the required capabilities for the predicted winds or (ii) replans the route to avoid flying over the highest terrain. The pilot then estimates the flight time to the destination and determines the approximate location of fuel stops for the trip. The Terminal Aerodrome Forecast (TAF) reports, fuel availability, fuel consumption, and expected traffic density at each airport where a landing is required will provide some constraints on choices of the fuel stop airports. The pilot examines the TAF reports (issued four times per day, plus amendments for unexpected weather changes) to obtain forecasts for a specified airport region for weather conditions, wind, visibility on the ground, sky conditions and the probability of precipitation or thunderstorms. Optionally, this is done for each airport that the pilot will pass over or near along the proposed flight route.

If the TAF conditions are within the limits of the aircraft, the pilot then examines the METAR reports for the source airport and destination airport and examines the airport characteristics (airport elevation, predominant wind direction, runway orientation(s) and length(s) and composition(s)). The pilot determines temperature, dew point, density altitude at the source, determines whether takeoff is possible, and determines whether the aircraft can climb directly to a cruise altitude or whether the aircraft must circle as it ascends to the cruise altitude. The pilot determines whether enroute weather conditions are developing as predicted. For example, is any fog that is present clearing as quickly as predicted? If weather conditions are unsettled and are not developing as predicted, the pilot may need to follow an alternate plan.

This preparation process is simplified using a system incorporating the invention. The system downloads DUAT source reports for a large geographical region at start-up. For ground operations, this may be done for all airports within a 1000-nm radius. For in-flight use, download is constrained by bandwidth limitations of any data link technology used. The system can work with text only, if desired, which lessens the effects of these limitations. The pilot is provided with enroute weather conditions for a region and is not required to specify a flight route. To specify a flight route, airports can be selected directly on a chart. The system can be activated hours before departure to obtain and present historical weather data. Access to actual weather conditions for a few hours before departure improves a pilot's analysis of trends, which can be updated with DUAT source reports as the flight proceeds.

Because METAR, TAF and Winds Aloft reports are also provided graphically, the pilot's analysis may be transformed from reading text and deciphering DUAT codes to visually interpreting graphical representations of weather conditions. The pilot may, for example, use color coded thresholds to reflect the pilot or aircraft limits and look for METAR and/or TAF rectangles that do not have yellow or red borders. Because each such report is displayed next to the airport it represents, the pilot need not mentally map airport identifiers, normally shown in text format, to the corresponding airports shown on the chart.

When the pilot selects a flight route, the system automatically estimates arrival times and presents the relevant TAF reports for the appropriate time intervals. If the pilot alters the proposed departure time(s) and/or the proposed crusing altitude(s) and/or cruising speed(s), the corresponding TAF reports and Winds Aloft reports are automatically modified accordingly.

Interpretations of METAR reports are also simplified. Visibility, ceiling and surface wind vectors that are outside the pilot and aircraft capabilities are flagged by yellow or red borders, for purposes of takeoff and/or landing. Density altitude at takeoff, ascent, cruise, descent and/or landing is automatically determined, or is provided in response to a verbal request to the system.

A trend in conditions can also be evaluated by the pilot, using a trend display and actual versus predicted weather conditions for a specified preceding time interval, such as three hours. If, for example, a trend indicates that fog will likely still obscure a destination airport, the system provides an alternate destination airport that meets the constraints of the pilot and aircraft.

With reference to the cruise or enroute portion of a flight, the system will observe and learn the particular ranges of conditions (referred to collectively herein as "situations," determined by one or more parameter ranges) that will cause a given pilot to request a textual, graphic and/or audible display of a corresponding group of weather data. The most likely situations will involve distance (or time) to a specified destination, wind conditions at or near the destination, aircraft fuel remaining, and substantial (adverse) changes in weather conditions along the proposed flight route. In response to occurrence of a specified situation, the system will automatically textually, graphically and/or audibly display the corresponding weather data, including updated information, that would normally be requested by the pilot in those circumstances. Optionally, the pilot may verbally request a change between textual, graphical and audible presentations.

Potentially, the busiest time for a pilot is during preparations for descent and landing at a destination. The pilot must obtain, and understand the significance of, the relevant weather conditions at the destination, such as visibility, ceiling, temperature, dew point, wind conditions, distance from destination, etc. The system automatically provides the corresponding displays of relevant information, which may include density altitude, runway orientation, updated wind conditions.

Another phase of a flight involves diversion or flight route replanning and is not present for many flights. Here, the system initially emphasizes prompt presentation of data relevant to the route diversion or replanning process, in response to entry, by the pilot or otherwise, of certain constraints, such as fuel remaining, maximum standard altitude or density altitude for an acceptable alternate destination, VFR or IFR landing, minimum ceiling required, minimum visibility preferred, and maximum cross wind or wind gusts that can be handled. In response to receipt of these constraint statements from the pilot and determination that the original destination doesn't meet one or more of these constraints, the system searches through the DUAT report or other relevant weather reports, including updates, and provides one or more alternate destinations and corresponding weather conditions, ranked in terms of a metric that takes account of how many of (and how well) the constraints are satisfied. Optionally, the system displays (textually, graphically and/or audibly) other weather and related conditions, not explicitly covered by the constraints entered by the pilot, that may also be relevant to the choice of an alternate destination. These other conditions may include fuel availability at the alternate destination, sleep-over accomodations, hours of operation, runway orientation relative to present wind vector, etc.

The reflex learning algorithm EARL, in one embodiment, examines measurements or estimates for as many as 12 weather variables, which may be referred to as "situation parameters" and identifies one or more ranges of a subset of these variables for which the pilot normally (or habitually) requests a display of one or more weather parameters. A subset of these weather variables need not include ranges for all of these variables; a proper subset of the 12 variables may be identified and used by the system.

Estimated trip length TL, expressed as a time interval or as a distance interval, is assigned a three-bit binary value $(x3)(x2)(x1)$, where x1, x2 and x3 refer to a "short length" trip, to a "medium length" trip and to a "long length" trip, respectively. The range for (estimated) length of a trip is thus represented by the integers 0–7. For example, if the pilot requests particular weather information for all long trips and all medium trips (x3=1 and x2=1), the range for this variable becomes (1,1,0), or an equivalent integer value of 6. If at most one of the trip lengths is specified at any one time, a two-bit binary value $(x2')(x1')$ can be used here and, for example, $(x2',x1')=(1,1)$, (1,0), (0,1) and (0,0) may correspond to a long trip, a medium trip, a short trip and NOP, respectively.

A trip phase parameter (pre-departure, takoff, ascent, cruise, descent, approach, landing, search for alternative destination, etc.) may also be expressed as a three-bit or four-bit binary value $(y3)(y2)(y1)$, corresponding to each of the different trip phases that are accounted for by this variable. Preferably, at most one value of the trip phase parameter is present at any time. For example, the pre-departure and takeoff phases may correspond to (y3,y2,y1) =(0,0,0) and (0,0,1), respectively.

The (estimated) distance from destination variable $\Delta s(dest)$ is assigned an arithmetic average of all the values for occurrences of request of a selected display and is associated with the particular combinatiuon of items included in the selected display. A range (lower limit,upper limit) for this variable may also be assigned, where "lower limit" may have a value of 0 or have a positive value. Where each of two or more situation parameter subsets includes the quantity $\Delta s(dest)$, each subset may have its own range for $\Delta s(dest)$.

The (estimated) visibility variable is assigned a maximum value (e.g., VIS(max)=2.4 nm) for all the visibility values at which the pilot has requested a selected display and is associated with the particular combination of items included in the selected display. The range for the visibility variable becomes $0 \leq VIS \leq VIS(max)$.

Where a new visibility value, denoted VIS(new), is received for which a weather parameter display is requested by the pilot, the present visibility value, denoted VIS(old; max), is replaced by a new value that (re)defines the visibility range, VIS(max)=max{VIS(new), VIS(old;max)}. This re-definition is applied by analogy to each of the parameters VIS(max), Ce(max) and $\Delta T(dew;max)$, for which a maximum value is used to define the applicable range for that parameter.

The (estimated) ceiling or sky cover variable Ce is assigned a maximum value (e.g., Ce(max)=1200 feet) for all the ceiling values at which the pilot has requested a selected display and is associated with the particular combination of items included in the selected display. The range for the ceiling variable becomes $0 \leq Ce \leq Ce(max)$.

The temperature-dew point spread variable $\Delta T(dew)$ is assigned a maximum value (e.g., $\Delta T(dew;max)=4°$ C.) for all the spread values at which the pilot has requested a selected display and is associated with the particular combination of items included in the selected display. The range for the temperature-dew point spread variable becomes $0 \leq \Delta T(dew) \leq \Delta T(dew;max)$.

The (estimated) longitudinal wind speed variable is assigned a minimum value (e.g., $v_w(long;min)=10$ knots) for all the wind speed values at which the pilot has requested a selected display and is associated with the particular combination of items included in the selected display. The range for the longitudinal wind speed variable becomes $v_w(long) \geq v_w(long;min)$.

Where a new longitudinal wind speed value, denoted v(long;new), is received for which a weather parameter display is requested by the pilot, the present wind speed value, denoted v(long;old;min), is replaced by a new value that (re)defines the longitudinal wind speed range, v(long; min)=min{v(long;new), v(long;old;min)}. This re-definition is applied by analogy to each of the variables, v(cr;min)) and h(dens;min), for which a minimum value is used to define the applicable range for that variable.

The (estimated) cross wind speed variable is assigned a minimum value (e.g., $v_w(cr;min)=15$ knots) for all the wind speed values at which the pilot has requested a selected display and is associated with the particular combination of items included in the selected display. The range for the cross wind speed variable becomes $v_w(cr) \geq v_w(cr;min)$.

The (estimated) density altitude variable h(dens) is assigned a minimum value (e.g., h(dens)=4,000 ft) for all the density altitude values at which the pilot has requested a selected display and is associated with the particular combinatiuon of items included in the selected display. The range for the density altitude variable becomes $h(dens) \geq h(dens;min)$.

One or more of the weather variables trip length TL, trip phase TP, distance from destination $\Delta s(dest)$, ceiling Ce, dew point-temperature spread $\Delta T(dew)$, temperature T, longitudinal wind speed $v_w(long)$, cross wind speed $v_w(cr)$, gust wind speed $v_w(gust)$, altitude h and density altitude h(dens) may be assigned a default value.

Figure 11A:
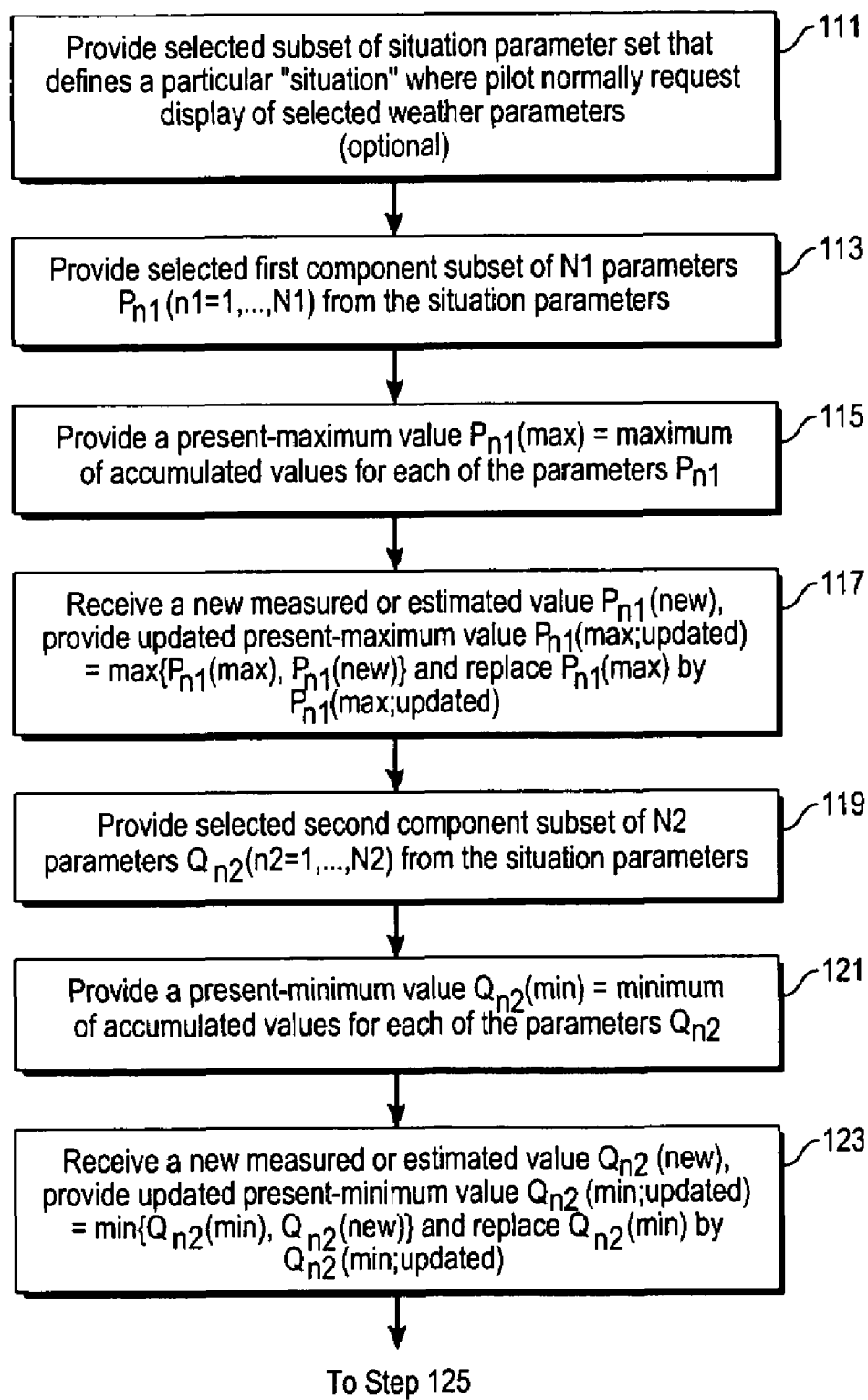
Figure 11B:
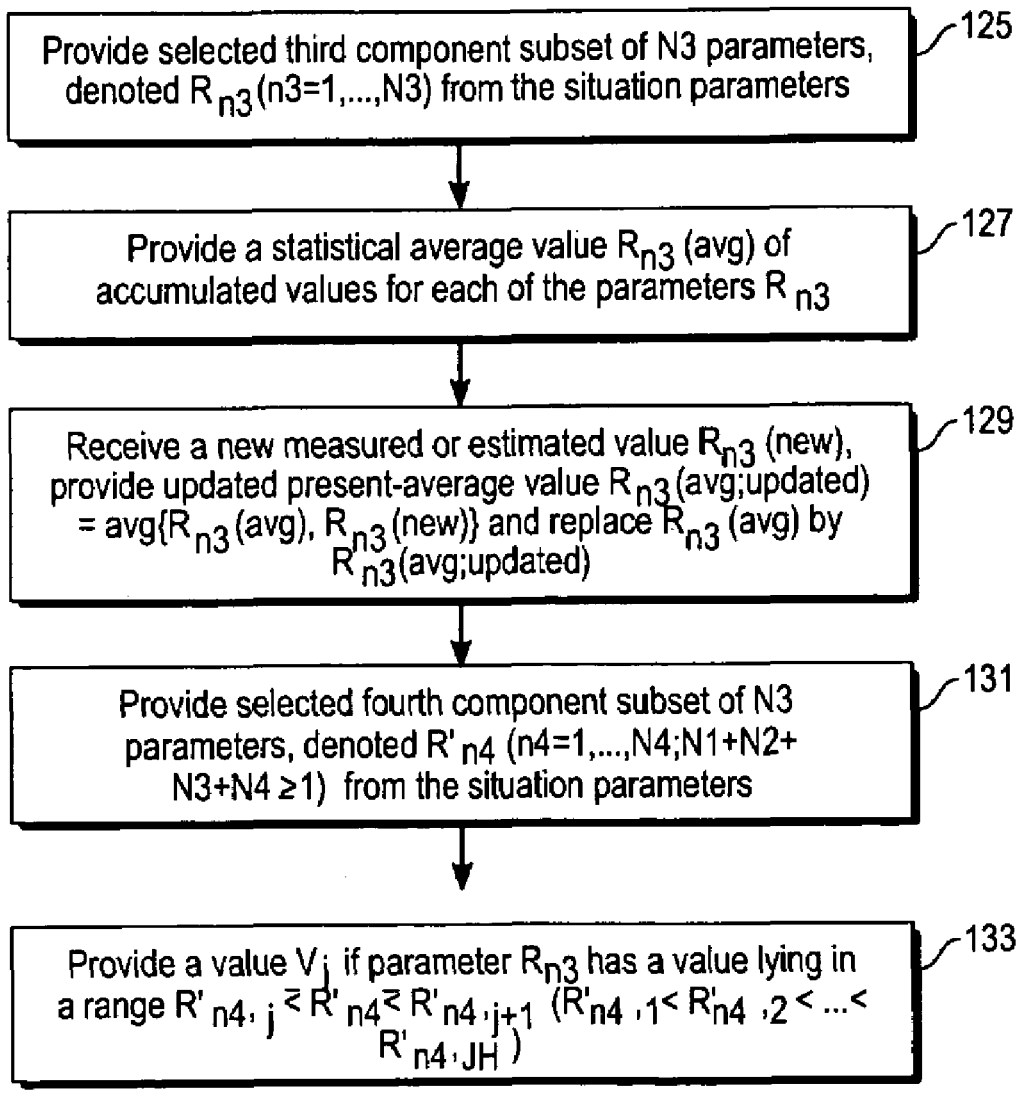

FIGS. 11A and 11B illustrate a procedure for determining a range or ranges of the situation parameters in a particular subset of these parameters, for which a given pilot will normally (or habitually) request a display or one or more reference weather parameters. In step 111 (optional), the system is provided with a selected subset of the situation parameters that are to be used to define a "situation" whereby a (specified) pilot normally (or habitually) requests a display of one or more selected weather parameters. Step 111 can be deleted or modified, if the system is configured to identify part or all of the subset of situation parameters to be used to define a situation of interest. More than one situation can be defined, each with its own subset of situation parameters, where two situations differ from each other by at least one of the situation parameters. A subset of situation parameters may include: (1) a first component subset of parameters in which the useful range of each parameter is updated using a maximum operation; (2) a second component subset of parameters in which the useful range of each parameter is updated using a minimum operation; (3) a third component subset of parameters in which the useful range of each parameter is updated using a statistical average operation; and (4) a fourth component subset of parameters in which the range is decomposed into semi-quantitative measures of the parameter (e.g., decomposition of the trip length parameter into a "short length" trip, a "medium length" trip and/or a "long length" trip). The first, second, third and fourth component subsets are preferably mutually exclusive, and the union of these four components subsets provides the selected subset of situation parameters. At least one of the three component subsets is non-empty.

In step 113, the system provides a selected first component subset of N1 parameters, denoted $p_{n1}$ (n1=1, ..., N1), from the selected subset of situation parameters, for which the qualifying range of the parameter $p_{n1}$ is defined as $p_{n1}$ no greater than a selected threshold value. In step 115, the system provides a present-maximum value $p_{n1}(max)$=maximum of the accumulated measured or estimated values for each of the parameters $p_{n1}$. In step 117, the system receives a new measured or estimated value of the parameter $p_{n1}$, denoted $p_{n1}(new)$, defines an updated present-maximum value of the parameter $p_{n1}$ as $p_{n1}(max;updated)$=max{$p_{n1}(max)$, $p_{n1}(new)$}, and replaces the value $p_{n1}(max)$ by the value $p_{n1}(max;updated)$.

In step 119, the system provides a selected second component subset of N2 parameters, denoted $q_{n2}$ (n2=1, ..., N2), from the seleectd subset of situation parameters. In step 121 the system provides a present-minimum value $q_{n2}(min)$ =minimum of the accumulated measured or estimated values for each of the parameters $q_{n2}$. In step 123, the system receives a new measured or estimated value of the parameter $q_{n2}$, denoted $q_{n2}(new)$, defines an updated present-minimum value of the parameter $q_{n2}$ as $q_{n2}(min;updated)$=min{$q_{n2}(min)$, $q_{n2}$}, and replaces the value $q_{n2}(min)$ by the value $q_{n2}(min;updated)$.

In step 125, the system provides a selected third component subset of N2 parameters, denoted $r_{n3}$ (n3=1, ..., N3), from the selected subset of situation parameters. In step 127 the system provides a statistical average value $r_{n3}$(avg) of the accumulated measured or estimated values for each of the parameters $r_{n3}$. In step 129, the system receives a new measured or estimated value of the parameter $r_{n3}$, denoted $r_{n3}$(new), defines an updated present-statistical average value of the parameter $r_{n3}$ as $r_{n3}$(avg;updated)=avg$\{r_{n3}$(avg), $r_{n3}\}$, and replaces the value $r_{n3}$(avg) by the value $r_{n3}$(avg; updated).

In step 131, the system provides a selected fourth component subset of N4 parameters, denoted $r'_{n4}$ (n4=1, ..., N4; N1+N2+N3+N4≧1), from the set of situation parameters.

In step 133, for a set of measured or estimated values of the situation parameter $r'_{n4}$, the system provides a value Vj if $r'_{n4}$, lies in a range $r'_{n4,j} \leq r'_{n4} < r'_{n4,j+1}$, where $r'_{n4,1} < r'_{n4,2} \ldots < r'_{n4,J+1}$ (j=1 ..., J; J≧2); the values Vj may be distinct, or two or more of the values Vj may be the same. In one version, the values Vj (=0 or 1) for a particular parameter value $r_{n3}$ may be expressed as a sequence (V1,V2, ..., VJ), where at most one of the values Vj has a value of 1, all other values Vj in the sequence being 0. For example, with J=3, the ranges $r'_{n4,j} \leq r'_{n4} < r'_{n4,j+1}$, may correspond to low values, medium values and high values of the parameter $r'_{n4}$. The pilot may, for example, request display of the selected set of weather data when the parameter $r'_{n4}$ has a low value or a medium value; and only the parameter data corresponding to a low or medium values of this parameter ($r'_{n4,1} \leq r'_{n4} < r'_{n4,3}$) will be of interest for this situation (V1=1 or V2=1).

When an aircraft is enroute, the system checks to determine if each of a selected subset of weather parameters falls in a situation range (specified by the pilot and/or determined by the EARL algorithm). If each of the selected subset of weather parameters falls within the corresponding range, the system displays the corresponding weather information without a request by the pilot.

In a more general setting, this logic may be characterized as follows: (1) if each of a selected subset of weather parameters falls within a predetermined parameter range, and (2) if a particular location (airport, intersection, transition point) is on or adjacent to the route filed in the applicable flight plan, and (3) if the aircraft has not yet passed this location, display the corresponding weather parameter set. The system thus provides context-awareness, which may be characterized as task awareness relevant to the aircraft domain of operation. Domain awareness takes account of which elements of a METAR/TAF/Winds Aloft report are relevant to the display. Optionally, this context-awareness can be modified by the pilot's explicitly stated preference for (1) what range should be used for a situation parameter in a selected parameter subset, (2) what weather parameter(s) should be displayed in this event, and (3) how should the weather paremeter(s) be displayed (visually and/or audibly).

Table 1 sets forth a set of queries tracked by EARL that can be verbally entered by the pilot in order to receive a visual or audible display of a particular weather parameter. The verbal queries include the following: "Nearest IFR," "Nearest VFR," "METAR," "density altitude," "wind," "crosswind," "visibility," "ceiling," "elevation," "weather frequency," "suggest runway," "traffic pattern," "airport information," and "highlight destination." When the pilot wishes to provide an audible display or a visual display of METAR information, the pilot will speak the respective phrase "say METAR" or "show METAR." This distinction between audible and visual display of specified information also applies to the other entries in Table 1. The system also accepts a visually perceptible request for "METAR" and/or "Highlight Destination" information, through the GUI 30, that brings up a visual display of METAR information or destination location, as the case may be.

When the pilot verbally states "say visibility," for example, the system first checks to determine if each of the trip length TL, the distance from destination Δs, the visibility VIS(dest) and the dewpoint spread ΔT(dew;dest) is within its required range; and if each of these parameters is within its required range, the system audibly informs the pilot of present visibility VIS(dest). EARL then fuses the situation in effect when the pilot made the request, using the minimum, maximum, statistical average and/or union of semi-quantitative measures as described above. On subsequent flights, whan a similar situation is encountered, the system will automatically volunteer the visibility, in this example, without requiring any pilot action.

TABLE 1

| Verbal Request | TL | Δs | VIS | Ce | ΔT(dew) | T | $v_w$ | $v_w$(cr) | h(dens) |
|---|---|---|---|---|---|---|---|---|---|
| "METAR" | x | x | | | | | | | |
| "Nearest IFR" | x | x | x | x | x | | | | |
| "Nearest VFR" | x | x | x | x | x | | | | |
| "Density Altitude" | x | x | | | | x | | | x |
| "Wind" | x | x | | | | | x | x | |
| "Cross Wind" | x | x | | | | | x | x | |
| "Wind Gust" | x | x | | | | | x | x | |
| "Visibility" | x | x | x | | x | | | | |
| "Ceiling" | x | x | | x | x | | | | |
| "Elevation" | x | x | | | | | | | |
| "Weather Frequency" | x | x | | | | | | | |
| "Suggest Runway" | x | x | | | | | | | |
| "Traffic Pattern" | x | x | | | | | | | |
| "Airport Information" | x | x | | | | | | | |
| "Highlight Destination" | x | x | | | | | | | |

What is claimed is:

1. A method for presenting weather data and related data for use in aviation, the method comprising:

providing presently measured or estimated values for each of a selected subset of a set of selected situation parameters, where the situation parameter set comprises trip length, present phase of trip, trip departure time, distance from present location to a selected aircraft destination, visibility, ceiling or cloud cover, longitudinal wind speed, cross wind speed, wind gust speed, temperature, dew point and density altitude;

providing a reference database containing a collection of N reference situations, numbered n=1 ..., N (N≧2), with each reference situation being characterized by an ordered set of parameter value ranges, one range for each of the selected subset of parameters;

wherein at least one of the reference situations comprises a selected set of conditions consisting of: (1) trip phase being one of {pre-departure, takeoff, ascent and cruise}, AND at least one of:

(2A) $v_w(present;dest) - v_w(forecast;dest) \geq \Delta v_w(thr)$, where $\Delta v_w(thr)$ is a selected positive value; AND (2B) at least one of the following inequalities is satisfied: $\{\{\Delta T(dew;dest) \leq \Delta T(dew;thr)\}$ OR $\{VIS(dest) \leq VIS(dest;thr)\}$ OR $\{Ce(dest) \leq Ce(dest;thr)\}$ OR $\{v_w(long;dest) \geq v_w(long;thr)\}$ OR $\{v_w(cr;dest) \geq v_w(cr;thr)\}\}$, where $\Delta T(dew;thr)$, $VIS(dest;thr)$, $Ce(dest;thr$, $v_w(long;thr)$ and $v_w(cr;thr)$ are selected threshold values; AND (2C) at least one of the following inequalities is satisfied: $\{\{VIS(dest) \leq VIS(dest;thr)\}$ OR $\{Ce(dest) \leq Ce(dest;thr)\}$ OR $\{v_w(long;dest) \geq v_w(long;thr)\}$ OR $\{v_w(cr;dest) \geq v_w(cr;thr)\}\}$, where $VIS(dest;thr)$, $Ce(dest;thr)$, $v_w(long;thr)$ and $v_w(cr;thr)$ are selected threshold values; and when the measured or estimated value of each situation parameter in the selected subset lies within the corresponding value range for the parameter, displaying a selected subset of weather data, in at least one of visually perceptible format and audibly perceptible format, where the subset of weather data is drawn from a set of weather data that comprises a measured value or estimated value of at least one of aircraft present altitude, static air pressure at aircraft present altitude, longitudinal wind speed, crosswind speed, wind gust speed, wind variability, wind vector direction, temperature, dew point, temperature-dewpoint spread, density altitude, sky condition for at least one altitude range, ground visibility at a selected aircraft destination, ground precipitation at the selected destination, visibility obscurations along aircraft flight route, ceiling, distance from the selected destination, fuel required to reach the selected destination, recommended runway for the selected destination, and time of most recent measurement upon which the subset of weather data is based.

2. The method of claim 1, further comprising:

when said conditions (1) and (2A) are satisfied, displaying estimated fuel required to move from aircraft present location to said destination in at least one of a visually perceptible format and an audibly perceptible format.

3. The method of claim 1, further comprising:

when said conditions (1) and (2B) are satisfied, displaying at least one of $\Delta T(dew;dest)$, $VIS(dest)$, $Ce(dest)$, $v_w(long;dest)$ and $v_w(cr;dest)$ in at least one of a visually perceptible format and an audibly perceptible format.

4. The method of claim 1, further comprising:

when said conditions (1) and (2C) are satisfied, displaying at least one of $VIS(dest)$, $Ce(dest)$, $v_w(long;dest)$ and $v_w(cr;dest)$ in at least one of a visually perceptible format and an audibly perceptible format.

5. The method of claim 1, further comprising providing a reference database modification module that implements at least one of: (i) change of said range for at least one of said parameters in said selected subset; (ii) deletion of a parameter in said selected subset and deletion of said corresponding value range; (iii) addition of a parameter to said selected subset and addition of a corresponding value range for the added parameter; and (iv) specification of at least one of said visually perceptible display and said audibly perceptible display for said display of said selected subset of weather data.

6. A method for presenting weather data and related data for use in aviation, the method comprising:

providing presently measured or estimated values for each of a selected subset of a set of selected situation parameters, where the situation parameter set comprises trip length, present phase of trip, trip departure time, distance from present location to a selected aircraft destination, visibility, ceiling or cloud cover, longitudinal wind speed, cross wind speed, wind gust speed, temperature, dew point and density altitude;

providing a reference database containing a collection of N reference situations, numbered n=1, ..., N (N≧2), with each reference situation being characterized by an ordered set of parameter value ranges, one range for each of the selected subset of parameters;

wherein at least one of the reference situations comprises a selected set of conditions consisting of: (1) trip phase being one of {approach}; AND at least one of:

(2A) at least one of the following inequalities is satisfied: $\{\{h(dens;dest) \geq h(dens;dest;thr)\}$ OR $\{VIS(dest) \leq VIS(dest;thr)\}$ OR $\{Ce(dest) \leq Ce(dest;thr)\}$ OR $\{v_w(long;dest) \geq v_w(long;thr)\}$ OR $\{v_w(cr;dest) \geq v_w(cr;thr)\}\}$, where $h(dens;dest;thr)$, $VIS(dest;thr)$, $Ce(dest;thr)$, $v_w(long;thr)$ and $v_w(cr;thr)$ are selected threshold values; AND (2B) at least one of the following inequalities is satisfied: $\{\{VIS(dest) \leq VIS(dest;thr)\}$ OR $\{Ce(dest) \leq Ce(dest;thr)\}$ OR $\{v_w(long;dest) \geq v_w(long;thr)\}$ OR $\{v_w(cr;dest) \geq v_w(cr;thr)\}\}$, where $VIS(dest;thr)$, $Ce(dest;thr)$, $v_w(long;thr)$ and $v_w(cr;thr)$ are selected threshold values; and when the measured or estimated value of each situation parameter in the selected subset lies within the corresponding value range for the parameter, displaying a selected subset of weather data, in at least one of visually perceptible format and audibly perceptible format, where the subset of weather data is drawn from a set of weather data that comprises a measured value or estimated value of at least one of aircraft present altitude, static air pressure at aircraft present altitude, longitudinal wind speed, crosswind speed, wind gust speed, wind variability, wind vector direction, temperature, dew point, temperature-dewpoint spread, density altitude, sky condition for at least one altitude range, ground visibility at a selected aircraft destination, ground precipitation at the selected destination, visibility obscurations along aircraft flight route, ceiling, distance from the selected destination, fuel required to reach the selected destination, recommended runway for the selected destination, and time of most recent measurement upon which the subset of weather data is based.

7. The method of claim 6, further comprising:
when said conditions (1) and (2A) are satisfied, displaying at least one of h(dens(dest;thr), VIS(dest), Ce(dest), $v_w$(long;dest), $v_w$(cr;dest) and recommended runway at said selected destination in at least one of a visually perceptible format and an audibly perceptible format.

8. The method of claim 6, further comprising:
when said conditions (1) and (2A) are satisfied, displaying at least one of VIS(dest), Ce(dest), $v_w$(long;dest), $v_w$(cr;dest) and recommended runway at said selected destination in at least one of a visually perceptible format and an audibly perceptible format.

9. A method for presenting weather data and related data for use in aviation, the method comprising:
providing presently measured or estimated values for each of a selected subset of a set of selected situation parameters, where the situation parameter set comprises trip length, present phase of trip, trip departure time, distance from present location to a selected aircraft destination, visibility, ceiling or cloud cover, longitudinal wind speed, cross wind speed, wind gust speed, temperature, dew point and density altitude;
providing a reference database containing a collection of N reference situations, numbered n=1, ..., N (N≥2), with each reference situation being characterized by an ordered set of parameter value ranges, one range for each of the selected subset of parameters;
wherein at least one of the reference situations comprises a selected set of conditions consisting of: (1) trip phase being one of {cruise, descent, approach}, AND at least one of:
(2A) at least one of the following inequalities is satisfied: {{h(dens;NANYFB)≥h(dens;NANYFB;thr)} OR {VIS(NANYFB)≤VIS(NANYFB;thr)} OR {Ce(NANYFB)≤Ce(dest;thr)}}, where h(dens;NANYFB;thr), VIS(NANYFB;thr) and Ce(NANYFB;thr) are selected threshold values and "NANYFB" refers to an airport within a selected transverse distance from said flight route that has not yet been flown past by said aircraft; AND
(2B) at least one of the following inequalities is satisfied: {{VIS(NANYFB)≤VIS(NANYFB;thr)} OR {Ce(NANYFB)≤Ce(dest;thr)}}, where VIS(NANYFB;thr) and Ce(NANYFB;thr) are selected threshold values and "NANYFB" refers to an airport within a selected transverse distance from said flight route that has not yet been flown past by said aircraft; AND
(2C) {Δs(dest)≤Δs(thr)} AND (3) at least one of the following inequalities is satisfied: {{$v_w$(cr;dest)≥$v_w$(cr;thr)} OR {$v_w$(gust;dest)≥$v_w$(gust;thr)}}, where $v_w$(cr;thr) and $v_w$(gust;thr) are selected threshold values;
when the measured or estimated value of each situation parameter in the selected subset lies within the corresponding value range for the parameter, displaying a selected subset of weather data, in at least one of visually perceptible format and audibly perceptible format, where the subset of weather data is drawn from a set of weather data that comprises a measured value or estimated value of at least one of aircraft present altitude, static air pressure at present altitude, longitudinal wind speed, crosswind speed, wind gust speed, wind variability, wind vector direction, temperature, dew point, temperature-dewpoint spread, density altitude, sky condition for at least one altitude range, ground visibility at a selected aircraft destination, ground precipitation at the selected destination, visibility obscurations along aircraft flight route, ceiling, distance from the selected destination, fuel required to reach the selected destination, recommended runway for the selected destination, and time of most recent measurement upon which the subset of weather data is based.

10. The method of claim 9, further comprising:
when said conditions (1) and (2A) are satisfied, displaying at least one of location of NANYFB, h(dens(NANYFB;thr), VIS(NANYFB), Ce(NANYFB) and recommended runway at said selected destination in at least one of a visually perceptible format and an audibly perceptible format.

11. The method of claim 9, further comprising:
when said conditions (1) and (2B) are satisfied, displaying at least one of location of NANYFB, VIS(NANYFB), Ce(NANYFB) and recommended runway at said selected destination in at least one of a visually perceptible format and an audibly perceptible format.

12. The method of claim 9, further comprising:
when said conditions (1) and (2C) are satisfied, displaying at least one of $v_w$(cr;dest), $v_w$(gust;dest) and recommended runway at said selected destination in at least one of a visually perceptible format and an audibly perceptible format.

13. A method for presenting weather data and related data for use in aviation, the method comprising:
providing presently measured or estimated values for each of a selected subset of a set of selected situation parameters, where the situation parameter set comprises trip length, present phase of trip, trip departure time, distance from present location to a selected aircraft destination, visibility, ceiling or cloud cover, longitudinal wind speed, cross wind speed, wind gust speed, temperature, dew point and density altitude;
providing a reference database containing a collection of N reference situations, numbered n=1 ..., N (N≥2), with each reference situation being characterized by an ordered set of parameter value ranges, one range for each of the selected subset of parameters, wherein at least one of said reference situations comprises a selected condition consisting of at least one of the following: {{VIS(forecast;dest)−VIS(present;dest)≥ΔVIS(thr)}, OR {Ce(forecast;dest)−Ce(present;dest)≥ΔCe(thr)} OR {ΔT(dew;dest)≤ΔT(dew;thr)} OR {$v_w$(long;dest)≥$v_w$(long;thr)} OR {$v_w$(cr;dest)≥$v_w$(cr;thr)}}, where ΔVIS(thr), ΔCe(thr), ΔT(dew;thr), $v_w$(long;thr) and $v_w$(cr;thr) are selected positive values};
when the selected conditions is satisfied, displaying at least one of VIS(present;dest), Ce(present;dest), ΔT(dew;dest), $v_w$(long;dest) and $v_w$(cr;dest) in at least one of a visually perceptible format and an audibly perceptible format; and
when the measured or estimated value of each situation parameter in the selected subset lies within the corresponding value range for the parameter, displaying a selected subset of weather data, in at least one of visually perceptible format and audibly perceptible format, where the subset of weather data is drawn from a set of weather data that comprises a measured value or estimated value of at least one of aircraft present altitude, static air pressure at aircraft present altitude, longitudinal wind speed, crosswind speed, wind gust speed, wind variability, wind vector direction, temperature, dew point, temperature-dewpoint spread, density altitude, sky condition for at least one altitude range, ground visibility at a selected aircraft destination, ground precipitation at the selected destination, visibility obscurations along aircraft flight route, ceiling, distance from the selected destination, fuel required to reach the selected destination, recommended runway for the selected destination, and time of most recent measurement upon which the subset of weather data is based.

14. The method of claim 13, further comprising:
when said conditions (1) and (2B) are satisfied, displaying at least one of VIS(present;dest), Ce(present;dest), $\Delta T$(dew;dest), $v_w$(long;dest) and $v_w$(cr;dest) in at least one of a visually perceptible format and an audibly perceptible format.

15. A method for presenting weather data and related data for use in aviation, the method comprising:
providing presently measured or estimated values for each of a selected subset of a set of selected situation parameters, where the situation parameter set comprises trip length, present phase of trip, trip departure time, distance from present location to a selected aircraft destination, visibility, ceiling or cloud cover, longitudinal wind speed, cross wind speed, wind gust speed, temperature, dew point and density altitude;
providing a reference database containing a collection of N reference situations, numbered n=1, . . . , N (N$\geq$2), with each reference situation being characterized by an ordered set of parameter value ranges, one range for each of the selected subset of parameters;
when the measured or estimated value of each situation parameter in the selected subset lies within the corresponding value range for the parameter, displaying a selected subset of weather data, in at least one of visually perceptible format and audibly perceptible format, where the subset of weather data is drawn from a set of weather data that comprises a measured value or estimated value of at least one of aircraft present altitude, static air pressure at aircraft present altitude, longitudinal wind speed, crosswind speed, wind gust speed, wind variability, wind vector direction, temperature, dew point, temperature-dewpoint spread, density altitude, sky condition for at least one altitude range, ground visibility at a selected aircraft destination, ground precipitation at the selected destination, visibility obscurations along aircraft flight route, ceiling, distance from the selected destination, fuel required to reach the selected destination, recommended runway for the selected destination, and time of most recent measurement upon which the subset of weather data is based;
choosing at least one of said reference situations to comprise a selected set of conditions consisting of: for a set of METAR weather parameter values WP(METAR;m) and a set of corresponding TAF weather parameter values WP(TAF;m) (m=1, . . . , M; M$\geq$1), a weather parameter difference |WP(METAR; m)−WP(TAF;m)| is at least equal to a selected threshold value $\Delta$WP(m;thr) for at least one number, m=m'; and
when the selected set of conditions is satisfied, displaying at least one of WP(METAR;m') and WP(TAF;m') in at least one of a visually perceptible format and an audibly perceptible format.

16. A method for presenting weather data and related data for use in aviation, the method comprising:
providing presently measured or estimated values for each of a selected subset of a set of selected situation parameters, where the situation parameter set comprises trip length, present phase of trip, trip departure time, distance from present location to a selected aircraft destination, visibility, ceiling or cloud cover, longitudinal wind speed, cross wind speed, wind gust speed, temperature, dew point and density altitude;
providing a reference database containing a collection of N reference situations, numbered n=1, . . . , N (N$\geq$2), with each reference situation being characterized by an ordered set of parameter value ranges, one range for each of the selected subset of parameters;
when the measured or estimated value of each situation parameter in the selected subset lies within the corresponding value range for the parameter, displaying a selected subset of weather data, in at least one of visually perceptible format and audibly perceptible format, where the subset of weather data is drawn from a set of weather data that comprises a measured value or estimated value of at least one of aircraft present altitude, static air pressure at aircraft present altitude, longitudinal wind speed, crosswind speed, wind gust speed, wind variability, wind vector direction, temperature, dew point, temperature-dewpoint spread, density altitude, sky condition for at least one altitude range, ground visibility at a selected aircraft destination, ground precipitation at the selected destination, visibility obscurations along aircraft flight route, ceiling, distance from the selected destination, fuel required to reach the selected destination, recommended runway for the selected destination, and time of most recent measurement upon which the subset of weather data is based;
providing a list of alternate weather data comprising at least one of the following data items: METAR data, nearest IFR, nearest VFR, density altitude, wind velocity, cross wind, wind gust, visibility, ceiling, elevation, weather frequency, suggest runway at said selected destination, traffic pattern at said selected destination, airport information and highlight destination; and
verbally or visually entering at least one of a selected audible display phrase and a selected visual display phrase including specification of one of the data items in order to provide at least one of an audibly perceptible display and a visually perceptible display of information concerning the specified data item.

17. A method for presenting weather data and related data for use in aviation, the method comprising:
providing presently measured or estimated values for each of a selected subset of a set of selected situation parameters, where the situation parameter set comprises trip length, present phase of trip, trip departure time, distance from present location to a selected aircraft destination, visibility, ceiling or cloud cover, longitudinal wind speed, cross wind speed, wind gust speed, temperature, dew point and density altitude, wherein the trip length is specified to be at least one of "short," "medium," and "long";
providing a reference database containing a collection of N reference situations, numbered n=1, . . . , N (N$\geq$2), with each reference situation being characterized by an ordered set of parameter value ranges, one range for each of the selected subset of parameters; and
when the measured or estimated value of each situation parameter in the selected subset lies within the corresponding value range for the parameter, displaying a selected subset of weather data, in at least one of visually perceptible format and audibly perceptible format, where the subset of weather data is drawn from a set of weather data that comprises a measured value or estimated value of at least one of aircraft present altitude, static air pressure at aircraft present altitude, longitudinal wind speed, crosswind speed, wind gust speed, wind variability, wind vector direction, temperature, dew point, temperature-dewpoint spread, density altitude, sky condition for at least one altitude range, ground visibility at a selected aircraft destination, ground precipitation at the selected destination, visibility obscurations along aircraft flight route, ceiling, distance from the selected destination, fuel required to reach the selected destination, recommended runway for the selected destination, and time of most recent measurement upon which the subset of weather data is based, wherein the selected subset of weather data for a given trip is displayed only if the length of the given trip is included in the provided trip length preference.

* * * * *